United States Patent
Sun et al.

(10) Patent No.: US 11,716,122 B2
(45) Date of Patent: Aug. 1, 2023

(54) BEAM MANAGEMENT ENHANCEMENT FOR FR2 WITH V-POL/H-POL VIRTUALIZATION

(71) Applicant: APPLE INC., Cupertino, CA (US)

(72) Inventors: Haitong Sun, Cupertino, CA (US); Chunhai Yao, Beijing (CN); Chunxuan Ye, San Diego, CA (US); Dawei Zhang, Cupertino, CA (US); Hong He, Cupertino, CA (US); Oghenekome Oteri, San Diego, CA (US); Pengkai Zhao, Cupertino, CA (US); Sigen Ye, Cupertino, CA (US); Wei Zeng, Cupertino, CA (US); Weidong Yang, San Diego, CA (US); Wen Zhao, Cupertino, CA (US); Yushu Zhang, Beijing (CN)

(73) Assignee: APPLE INC., Cupertino, CA (US)

( * ) Notice: Subject to any disclaimer, the term of this patent is extended or adjusted under 35 U.S.C. 154(b) by 38 days.

(21) Appl. No.: 17/593,539

(22) PCT Filed: Apr. 15, 2021

(86) PCT No.: PCT/CN2021/087497
§ 371 (c)(1),
(2) Date: Sep. 20, 2021

(87) PCT Pub. No.: WO2022/028003
PCT Pub. Date: Feb. 10, 2022

(65) Prior Publication Data
US 2022/0311477 A1 Sep. 29, 2022

(30) Foreign Application Priority Data
Aug. 6, 2020 (WO) ................ PCT/CN2020/107501

(51) Int. Cl.
*H04B 7/0408* (2017.01)
*H01Q 15/24* (2006.01)
(Continued)

(52) U.S. Cl.
CPC ......... *H04B 7/0408* (2013.01); *H01Q 15/246* (2013.01); *H04B 7/0469* (2013.01); *H04B 7/10* (2013.01); *H04B 7/1555* (2013.01)

(58) Field of Classification Search
CPC ...... H04B 7/0408; H04B 7/0469; H04B 7/10; H04B 7/1555; H01Q 15/246
See application file for complete search history.

(56) References Cited

U.S. PATENT DOCUMENTS

2018/0092129 A1* 3/2018 Guo ................. H04W 56/0005
2018/0206153 A1* 7/2018 Qu .................... H04M 15/8038
(Continued)

FOREIGN PATENT DOCUMENTS

| CN | 109842434 A | 6/2019 |
|---|---|---|
| CN | 109890079 A | 6/2019 |

(Continued)

OTHER PUBLICATIONS

WIPO, International Search Report and Written Opinion, PCT/CN2021/087497, dated Jul. 7, 2021, 12 pages.

*Primary Examiner* — Sophia Vlahos
(74) *Attorney, Agent, or Firm* — Dorsey & Whitney LLP

(57) ABSTRACT

Various systems and methods disclosed herein describe improvements for beam management that leverage virtualization across a vertical polarization (V-Pol) and horizontal polarization (H-Pol). One or more of a user equipment (UE) and a base station may include an antenna array comprising V-Pol antenna elements and H-Pol antenna elements. The UE may determine a number of receive (Rx) beam of an Rx beam sweep are needed, signal this number to the base (Continued)

station, and perform the beam sweep according to one or both of the V-Pol and H-Pol. A UE may use group based beam reporting to indicate to the base station a transmit (Tx) beam upon which downlink MIMO using V-Pol and H-Pol may be supported by reporting a same transmission configuration indication (TCI) corresponding to the Tx beam for both a first Rx beam and a second Rx beam in a group based beam reporting message.

15 Claims, 11 Drawing Sheets

(51) Int. Cl.
*H04B 7/0456* (2017.01)
*H04B 7/10* (2017.01)
*H04B 7/155* (2006.01)

(56) References Cited

U.S. PATENT DOCUMENTS

| | | | |
|---|---|---|---|
| 2019/0044631 A1* | 2/2019 | Davydov | H04B 17/318 |
| 2019/0223033 A1* | 7/2019 | Nam | H04B 7/0805 |
| 2019/0261345 A1* | 8/2019 | Shi | H04W 72/046 |
| 2019/0335477 A1* | 10/2019 | Nam | H04L 5/005 |
| 2021/0315045 A1* | 10/2021 | Dutta | H04W 76/14 |

FOREIGN PATENT DOCUMENTS

| | | | | |
|---|---|---|---|---|
| CN | 110431756 A | 11/2019 | | |
| WO | 2018155795 A1 | 8/2018 | | |
| WO | WO-2018175728 A1 * | 9/2018 | | H04B 7/0695 |
| WO | 2019245199 A1 | 12/2019 | | |

* cited by examiner

```
NZP-CSI-RS-ResourceSet ::=    SEQUENCE {
    nzp-CSI-RS-ResourceSetId      NZP-CSI-RS-ResourceSetId,
    nzp-CSI-RS-Resources          SEQUENCE (SIZE (1..maxNrofNZP-CSI-RS-ResourcesPerSet))
                                     OF NZP-CSI-RS-ResourceId,
    repetition                    ENUMERATED { on, off }         OPTIONAL,    -- Need S
    aperiodicTriggeringOffset     INTEGER(0..6)                  OPTIONAL,    -- Need S
    trs-Info                      ENUMERATED {true}              OPTIONAL,    -- Need R
    ...,
    [[
    aperiodicTriggeringOffset-r16 INTEGER(0..31)                 OPTIONAL     -- Need S
    ]]
}
```

FIG. 2

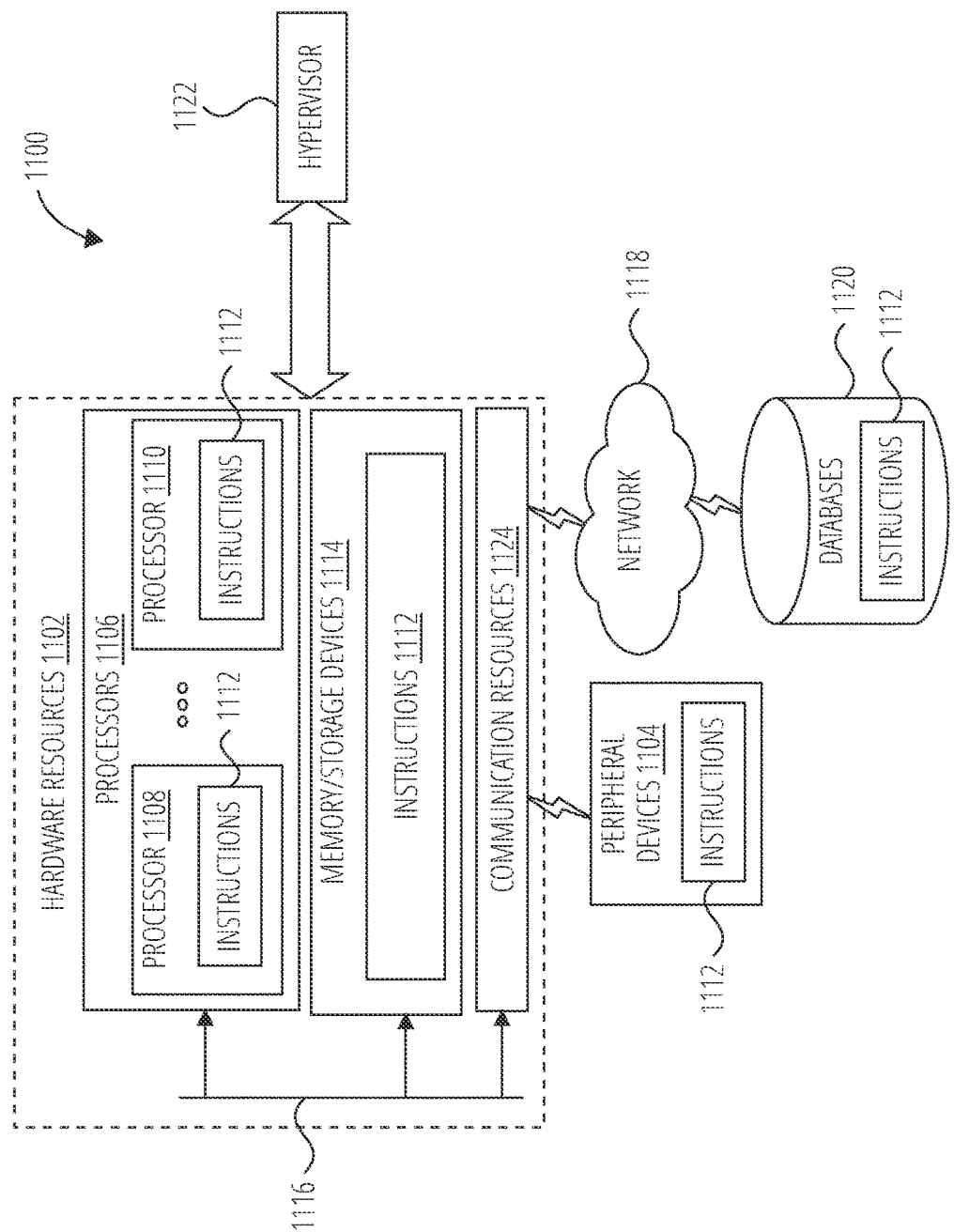

BEAM MANAGEMENT ENHANCEMENT FOR FR2 WITH V-POL/H-POL VIRTUALIZATION

TECHNICAL FIELD

This application relates generally to wireless communication systems, including systems and methods using virtualization across a horizontal polarization and a vertical polarization.

BACKGROUND

Wireless mobile communication technology uses various standards and protocols to transmit data between a base station and a wireless mobile device. Wireless communication system standards and protocols can include the 3rd Generation Partnership Project (3GPP) long term evolution (LTE) (e.g., 4G) or new radio (NR) (e.g., 5G); the Institute of Electrical and Electronics Engineers (IEEE) 802.16 standard, which is commonly known to industry groups as worldwide interoperability for microwave access (WiMAX); and the IEEE 802.11 standard for wireless local area networks (WLAN), which is commonly known to industry groups as Wi-Fi. In 3GPP radio access networks (RANs) in LTE systems, the base station can include a RAN Node such as a Evolved Universal Terrestrial Radio Access Network (E-UTRAN) Node B (also commonly denoted as evolved Node B, enhanced Node B, eNodeB, or eNB) and/or Radio Network Controller (RNC) in an E-UTRAN, which communicate with a wireless communication device, known as user equipment (UE). In fifth generation (5G) wireless RANs, RAN Nodes can include a 5G Node, NR node (also referred to as a next generation Node B or g Node B (gNB)).

RANs use a radio access technology (RAT) to communicate between the RAN Node and UE. RANs can include global system for mobile communications (GSM), enhanced data rates for GSM evolution (EDGE) RAN (GERAN), Universal Terrestrial Radio Access Network (UTRAN), and/or E-UTRAN, which provide access to communication services through a core network. Each of the RANs operates according to a specific 3GPP RAT. For example, the GERAN implements GSM and/or EDGE RAT, the UTRAN implements universal mobile telecommunication system (UMTS) RAT or other 3GPP RAT, the E-UTRAN implements LTE RAT, and NG-RAN implements 5G RAT. In certain deployments, the E-UTRAN may also implement 5G RAT.

Frequency bands for 5G NR may be separated into two different frequency ranges. Frequency Range 1 (FR1) includes sub-6 GHz frequency bands, some of which are bands that may be used by previous standards, but may potentially be extended to cover potential new spectrum offerings from 410 MHz to 7125 MHz. Frequency Range 2 (FR2) includes frequency bands from 24.25 GHz to 52.6 GHz. Bands in the millimeter wave (mmWave) range of FR2 have shorter range but higher available bandwidth than bands in the FR1. Skilled persons will recognize these frequency ranges, which are provided by way of example, may change from time to time or from region to region.

BRIEF DESCRIPTION OF THE SEVERAL VIEWS OF THE DRAWINGS

FIG. 2 illustrates an NZP-CSI-RS-ResourceSet information element according to an embodiment.

FIG. 11 illustrates components in accordance with one embodiment.

DETAILED DESCRIPTION

Figure 1:
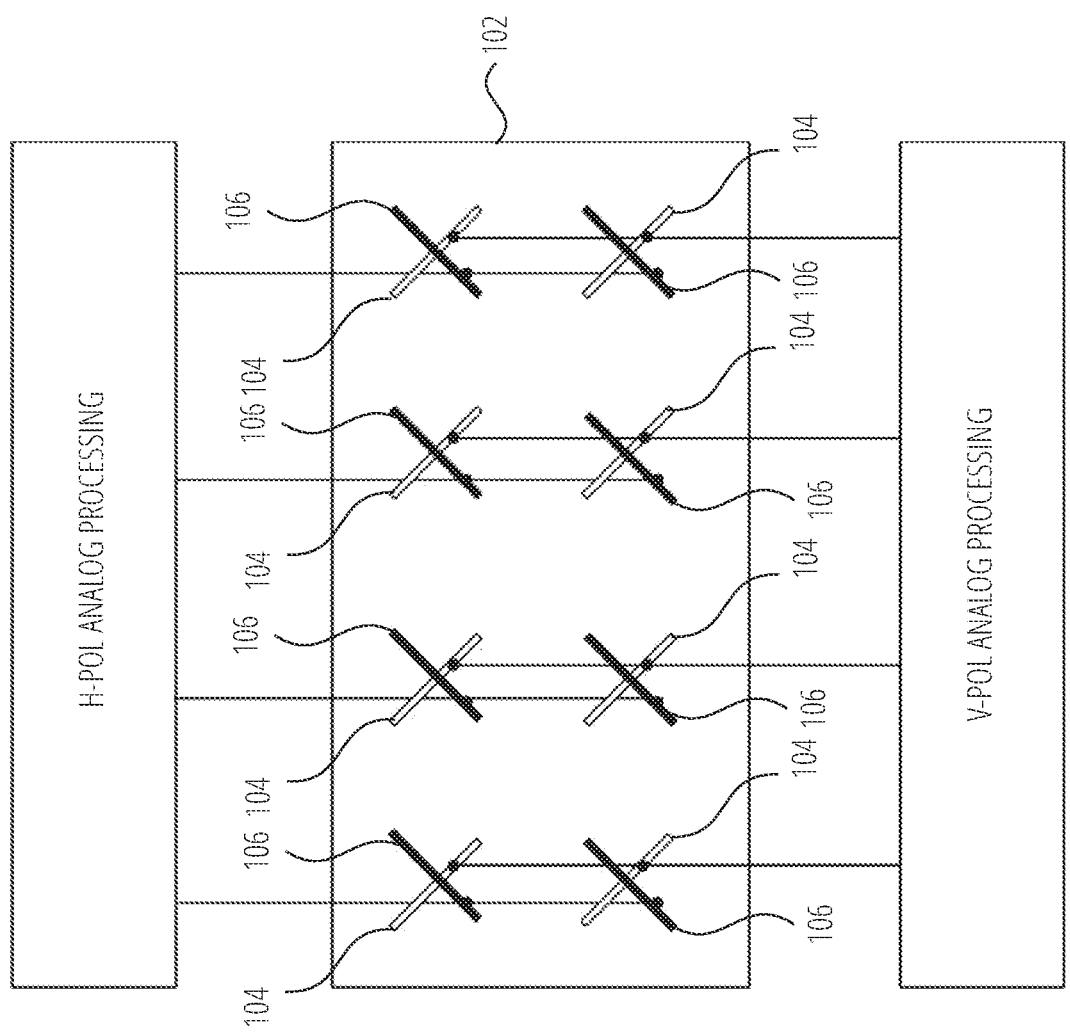
FIG. 1 illustrates an antenna panel that is configured for V-Pol and H-Pol communications, according to an embodiment.

Beam management at both the UE side and the base station side is a useful consideration in NR systems. Such considerations may be particularly salient in FR2, where beamforming may be required in some cases. Beam management considerations may include one or more of beam measurement, beam reporting, beam configuration (and related indications) and beam failure recovery. Beam measurement, beam configuration (along with related indications), and beam failure recovery may be largely base station driven, while beam reporting may be largely UE driven.

During a beam report by a UE, the UE may report information regarding one or more beams to the base station. It is recognized that NR supports periodic, aperiodic, and/or semi-persistent reference signals; periodic, aperiodic, and/or semi-persistent beam reporting; and group based and non-group based beam reporting. NR further supports the use, in a beam report, of a UE communication to a base station of one or more beam indexes/transmission configuration indications (TCIs) (e.g., a synchronization signal/physical broadcast channel block (SSB) resource indicator (SSBRI) and/or channel state information reference signal (CSI-RS) resource indicator (CRI)) and corresponding reference signal received power (RSRP) information, reference signal received quality (RSRQ) information, and/or signal-to-interference-plus-noise ratio (SINR) level(s).

In group-based beam reporting, the UE reports the quality of G groups of beams and in each group, K beams are reported. The beams in a group may be simultaneously received, or beams across groups may be simultaneously received. In some aspects, the Layer 1 (L1)-RSRQ/L1-SINR can be reported in either non-group-based beam reporting or group-based beam reporting or both. In one option, the UE reports the L1-RSRQ/L1-SINR for each of the beams. In another aspect, the UE reports the L1-RSRQ/L1-SINR for X best beam(s) and the differential L1-RSRQ/L1-RSRP for the other beams, where X could be fixed, e.g., 1, for non-group based beam reporting, and X could be 1 or equal to the number of groups or number of beams within a group for group-based beam reporting. In some aspects, if X>1 for group-based beam reporting, the differential L1-RSRQ/L1-SINR can be based on the reference beam in the same group or the same index within a group.

Given the fact that the beam measurement, beam configuration (and related indications), and beam failure recovery may be largely base station driven, it may be fairly said that beam management may be largely base station driven. However, it has been observed that, under the above conditions, the base station may not (at least initially) have complete information regarding a UE radio frequency (RF) and/or UE codebook information useful for efficiently performing beam management.

In practice, it may be desirable due to considerations at the UE to implement more advanced beam management processes than those described above (and/or improvements to the beam management processes described above). These more advanced/improved processes may enable to the UE to have a greater effect on beam management than in those prior systems.

It has been observed that beam management may be improved by leveraging one or more of: the use of hybrid analog and digital beam forming, the use of dynamic codebook sizes; the use of virtualization across a vertical polarization (V-Pol) and a horizontal polarization (H-Pol); and the use of dynamic antenna element activation and deactivation. Herein, enhancements to various beam management procedures (e.g., receive (Rx) beam sweep enhancements and group based beam reporting enhancements to support downlink (DL) multiple input multiple output (MIMO)) are described which leverage considerations from one or more of these.

Some embodiments disclosed herein relate particularly to, e.g., V-Pol and H-Pol considerations. FIG. 1 illustrates an antenna panel 102 that is configured for V-Pol and H-Pol communications, according to an embodiment. The antenna panel 102 may include one or more V-Pol antenna elements 104 and one or more H-Pol antenna elements 106. The V-Pol antenna elements 104 and the H-Pol antenna elements 106 may be set orthogonally to one another. Thus, when data is transmitted using one or more of the V-Pol antenna elements 104, the electric field so generated will be orthogonal to the electric field generated when data is transmitted using one or more of the H-Pol antenna elements 106. The antenna panel 102 (or one like it, with a different number of elements) may be found on either or both of a UE and a base station in systems and methods described below. Data transmitted/received on the V-Pol antenna elements 104 is said to be transmitted/received using V-Pol and data transmitted/received on the H-Pol antenna elements 106 is said to be transmitted/received using H-Pol.

A UE may implement and perform a beam sweep across one or more of its Rx beams (at least in part) according to a configuration provided to the UE by the base station. One way the base station may communicate said configuration to the UE is through the use of a "non zero power (NZP)-CSI-RS-ResourceSet" information element. FIG. 2 illustrates a NZP-CSI-RS-ResourceSet information element 200 according to an embodiment. As illustrated, the NZP-CSI-RS-ResourceSet information element 200 may include a sequence of CSI-RS resources 202 that are to be transmitted by the base station. As illustrated, the sequence of CSI-RS resources 202 may include an indication of the maximum number of CSI-RS resources 204 in the sequence of CSI-RS resources 202 (e.g., the "maxNrofNZP-CSI-RS-ResourcesPerSet" of the NZP-CSI-RS-ResourceSet information element 200).

The NZP-CSI-RS-ResourceSet information element 200 may further include a repetition parameter 206. The repetition parameter 206 may be associated with the sequence of CSI-RS resources 202 and may define whether UE can assume the CSI-RS resources within the sequence of CSI-RS resources 202 are transmitted with the same downlink (DL) spatial domain transmission filter (e.g., on the same transmit (Tx) beam). By setting the repetition parameter 206 to "on", the NZP-CSI-RS-ResourceSet information element 200 indicates to the UE that the base station will transmit the CSI-RS of the sequence of CSI-RS resources 202 on the same Tx beam of the base station. The Tx beam of the base station may have been determined previously (e.g., using a Tx beam sweep at the base station). The transmission of some or all of the sequence of CSI-RS resources 202 on the same base station Tx beam may then permit the UE to perform an Rx beam sweep that is useful for determining the best UE Rx beam. The best Rx beam may be determined to be the Rx beam with the best reception presuming the current Tx beam continues to be used at the base station going forward, and may be determined according to an RSRP and/or an SINR corresponding to each of the Rx beams.

A UE may be capable of signaling, to the base station, its preferred number of beams to use for an Rx beam sweep at the UE. This signaling may be accomplished by sending the base station a "maxNumberRxBeam" parameter indicating the preferred number of Rx beams that the UE will use for the beam sweep. The preferred number of Rx beams may be based on (and may change based on changes to) a preferred UE data rate and/or a preferred UE power usage. For example, if an application running on the UE demands a high data rate, the UE may determine that a narrow, precisely chosen beam is needed in order to meet the data rate requirement. Accordingly, the UE may signal a higher number of Rx beams to use for the Rx beam sweep so that the UE can test a large number of relatively narrower, precise beams during the Rx beam sweep. On the other hand, the UE may determine that reducing power usage is to be the guiding consideration for the Rx beam sweep. In this case, the UE may signal a relatively lower number of Rx beams for the Rx beam sweep, so that the UE can more quickly determine a beam to use (which may be wider and less precise than a beam selected according to an Rx beam sweep using a relatively higher number of beams).

To provide the transmissions from the base station side for the Rx beam sweep, the base station may then use a fixed Tx beam to individually transmit one or more of the CSI-RS of the sequence of CSI-RS resources 202, for a total number of transmissions equal to the preferred number of Rx beams indicated to the base station by the UE (allowing for one such transmission for each Rx beam that the UE sweeps through).

As illustrated, the sequence of CSI-RS resources 202 may include a number of CSI-RS resources up to a "maxNrofNZP-CSI-RS-ResourcesPerSet"). In some network configurations, this value may be as high as 64. Accordingly, for the Rx beam sweep under discussion, it is conceivable that the base station may be able to provide for the transmission of up to 64 CSI-RS on the same Tx beam. It is also understood that a large number of antenna elements (and a corresponding large codebook for use in forming beams with those antenna elements) may be included in a UE, thereby allowing for a UE to use up to a large number of beams (e.g., up to 64 beams in some cases). It is therefore desirable that a UE be capable of signaling (e.g., via a "maxNumberRxBeam" parameter as discussed above) for amounts of a preferred number of Rx beams greater than eight (which may be a limit according to some network configurations) up to, for example, 64. As specific (non-limiting) examples, it is anticipated that the UE may signal, as a preferred number of Rx beams, a number chosen from the set of 2, 3, 4, 5, 6, 7, 8, 12, 16, 20, 24, 28, 32, 36, 40, 44, 48, 52, 56, 60, and 64 (or any subset thereof). Other values between 2 and 64 not listed here are also contemplated. Values greater than 64 (presuming compatibility at the base station side) are also contemplated.

It may be beneficial to allow the UE to dynamically determine (e.g., change) a preferred number of Rx beams to use for an Rx beam sweep at the UE under certain conditions. For example, a UE that is currently using one number of beams for an Rx beam sweep may dynamically determine (e.g., based on changed application preferred data rate, changed signal conditions, and/or changed preferred power usage at the UE) that a different beam sweep (of a different number of Rx beams) should be performed in order to identify a different Rx beam (e.g., a narrower or wider beam determined according to a different number of preferred Rx beams) that is more compatible with the new circumstances (or to change the power usage and or time associated with Rx beam sweeps going forward with the new configuration). Accordingly, a new preferred number of Rx beams may be indicated to the base station to enable the base station to provide CSI-RS transmissions in the amount indicated relative to a new Rx beam sweep and according to the new preferred number of Rx beams.

In some cases, a new preferred number of Rx beams for an Rx beam sweep may be indicated to the base station as part of a MAC-CE, a Layer 1 (L1) measurement report, and/or a Layer 3 (L3) measurement report. This new preferred number of Rx beams may be indicated using the "maxNumberRxBeam" parameter in the manner described above.

In some embodiments, the UE may have previously provided, to the base station, a list of preferred number of Rx beams that the UE may potentially use. This list may be a subset of the possible values that the UE may be able to indicate to the UE as preferred numbers of Rx beams (e.g., a subset of values described above). The UE may then signal one or more of the preferred number of Rx beams that is on this pre-sent list. The use of such a list may reduce the complexity of the response at the base station to the new number of preferred number of Rx beams. For example, if the pre-sent list indicates that the UE may potentially indicate to the base station one of 4, 16, and 64 as the preferred number of Rx beams to use for the Rx beam sweep, the base station need only account for changes to its processes (as described above) in relation to these indicated potential preferred number of Rx beams (instead of, e.g., the entire set of possibilities, which may in some embodiments described above range anywhere from 2 to 64 (or more)). This reduction in complexity at the base station may be especially useful in cases were the base station is serving, for example, a large number of beamforming UEs simultaneously.

It has further been determined that the above-described flexibility as per the preferred number of Rx beams of a beam sweep performed at the UE may be applied in cases where the UE and the base station are capable of communications using one or more of a V-Pol and an H-Pol. Because of the orthogonality between V-Pol and H-Pol, it may be possible to usefully perform an Rx beam sweep on a V-Pol using the V-Pol antenna elements 104 at the same time a beam sweep is performed on a H-Pol using the H-Pol antenna elements 106.

In one possible application of a beam sweep according to polarities, the UE signals to the base station a number of CSI-RS resources necessary to support a reception of a unique CSI-RS on one of V-Pol, H-Pol, or both of V-Pol and H-Pol. For example, to perform a beam sweep with 16 beams on only one of V-Pol and H-Pol, the UE may signal a "maxNumberRxBeam" equal to 16. To perform a beam sweep with 16 beams on each of V-Pol and H-Pol, the UE may instead signal a "maxNumberRxBeam" equal to 32 (with the UE sweeping through the 16 beams on one polarization and 16 beams on the other polarization as the base station provides the 32 CSI-RS corresponding to the "maxNumberRxBeam" equal to 32).

In another possible application of a beam sweep according to polarities, a CSI-RS of a first NZP-CSI-RS-ResourceSet information element 200 may be transmitted on V-Pol antenna elements 104 of a base station and received at V-Pol antenna elements 104 of a UE at the same time that a CSI-RS of a second NZP-CSI-RS-ResourceSet information element 200 is transmitted by H-Pol antenna elements 106 of the base station and received at the H-Pol antenna elements 106 of the UE. Accordingly, the first NZP-CSI-RS-ResourceSet information element and the second NZP-CSI-RS-ResourceSet information element may contain the same number of CSI-RS to accomplish this.

It may be in this case that the first NZP-CSI-RS-ResourceSet information element and the second NZP-CSI-RS-ResourceSet information element share a same quasi-colocation (QCL), such as QCL-Type A and/or QCL-Type D, as applicable. This may mean, among other things, that the Tx beam used by the base station to transmit CSI-RSs according to the first NZP-CSI-RS-ResourceSet information element on the V-Pol is the same as the Tx beam used by the base station to simultaneously transmit CSI-RSs according to the second NZP-CSI-RS-ResourceSet information element on the H-Pol.

The UE may then perform its Rx beam sweep through each of its Rx beams on both the V-Pol and the H-Pol. For example, the UE may receive a CSI-RS from the first NZP-CSI-RS-ResourceSet on Rx beam 0 according to the V-Pol at the same time that it receives a CSI-RS from the second NZP-CSI-RS-ResourceSet on Rx beam 0 according to the H-Pol. The UE may then proceed to receive a second CSI-RS from the first NZP-CSI-RS-ResourceSet on Rx beam 1 according to the V-Pol at the same time that it receives a second CSI-RS from the second NZP-CSI-RS-ResourceSet on Rx beam 1 according to the H-Pol. This process may proceed through the total number of Rx beams of the beam sweep. In this fashion, the UE can determine, e.g., the qualities of each of the Rx beams on each of the V-Pol and the H-Pol.

The UE may then be configured to indicate whether the base station should use a V-Pol (and the corresponding CSI-RSs), an H-Pol (and the corresponding CSI-RSs), or a V-Pol and an H-Pol (and corresponding CSI-RSs on both V-Pol and H-Pol). To accomplish this indication, the UE may indicate to the UE whether to use of 1 or 2 NZP-CSI-RS-ResourceSets. If the UE indicates the use of one NZP-CSI-RS-ResourceSet, the base station may accordingly transmit only the CSI-RS of one NZP-CSI-RS-ResourceSet on one of the V-Pol and the H-Pol. If the UE indicates the use of two NZP-CSI-RS-ResourceSets, the base station may accordingly transmit CSI-RS of each of the two NZP-CSI-RS-ResourceSets one of each of the V-Pol and the H-Pol, as described above.

The UE may base its determination on whether to use one or two NZP-CSI-RS-ResourceSets on the relative strengths of the V-Pol and the H-Pol at its current location. These strengths may be determined based on, e.g., the SINR and/or RSRP of signals received using the V-Pol as compared to the SINR and/or RSRP of signals received using the H-Pol. In cases where these strengths are similar, the UE may indicate the use of two NZP-CSI-RS-ResourceSets for the Rx beam sweep. In cases where these strengths are dissimilar, and/or case where one of the polarizations has insufficient strength, the UE may indicate the use of one NZP-CSI-RS-Resource-Set for the Rx beam sweep. In cases where the use of one NZP-CSI-RS-ResourceSet is indicated, the use of V-Pol as opposed to H-Pol (or vice versa) may be based on a report from the UE to the base station of the stronger of the V-Pol and the H-Pol, or may alternatively be predetermined.

The specific manner of the UE's indication of whether to use 1 or 2 NZP-CSI-RS-ResourceSets may depend on the type of CSI-RS being used in the one or more NZP-CSI-RS-ResourceSets. In the case that periodic CSI-RS (P-CSI-RS) are used, the UE can indicate whether to configure or release one or more NZP-CSI-RS-ResourceSets via RRC message(s). In the case that semi-persistent CSI-RS (SP-CSI-RS) are used, the UE can indicate whether to activate or deactivate one or more NZP-CSI-RS-ResourceSets via MAC-CE(s). In the case where aperiodic CSI-RS (AP-CSI-RS) are used, the UE can indicate whether one or two NZP-CSI-RS-ResourceSets are triggered via uplink control information (UCI).

Figure 3:
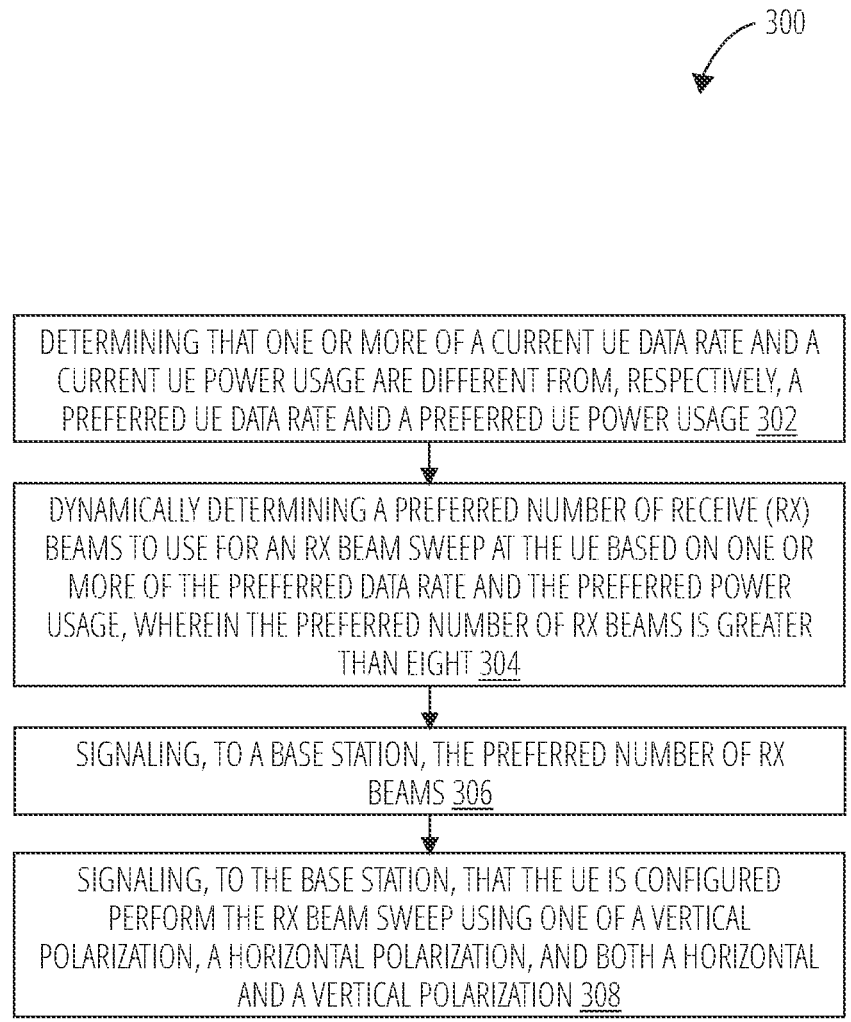
FIG. 3 illustrates a method for wireless communications by a user equipment, according to an embodiment.

FIG. 3 illustrates a method 300 for wireless communications by a user equipment, according to an embodiment. The method 300 includes determining 302 that one or more of a current UE data rate and a current UE power usage are different from, respectively, a preferred UE data rate and a preferred UE power usage.

The method 300 further includes dynamically determining 304 a preferred number of receive (Rx) beams to use for an Rx beam sweep at the UE based on one or more of the preferred data rate and the preferred power usage, wherein the preferred number of Rx beams is greater than eight.

The method 300 further includes signaling 306, to a base station, the preferred number of Rx beams.

The method 300 further includes signaling 308, to the base station, that the UE is configured perform the Rx beam sweep using one of a vertical polarization, a horizontal polarization, and both a horizontal and a vertical polarization.

A UE may implement and perform group based beam reporting. During group based beam reporting, first and second Transmission Configuration Indicators (TCIs) may be indicated in a single reporting set. Examples of TCIs may include SSB resource indicators (SSBRIs) and CSI-RS resource indicators (CRIs).

One or more single reporting sets of group based beam reporting may be used to support the virtualization of V-Pol and H-Pol in a DL MIMO context. In one example, a UE is configured (whether by itself or by the base station) for group based beam reporting. The UE determines that a Tx beam from the base station may be received at the UE on both V-Pol and H-Pol based on a strength of the polarities (e.g., by an SINR and/or RSRP of a signal received from the Tx beam using an Rx beam on V-Pol and an SINR and/or RSRP of a signal received from the Tx beam using an Rx beam on H-Pol). This determination may be based on the strength of each polarity individually and/or the relative strengths of the polarities. Once the UE determines that the Tx beam from the base station may be received at the UE on both the V-Pol and the H-Pol, the UE may prepare a group based beam reporting message that includes a reporting set that uses a TCI corresponding to the same Tx beam for each of the first and second TCI of the reporting set.

Figure 4:
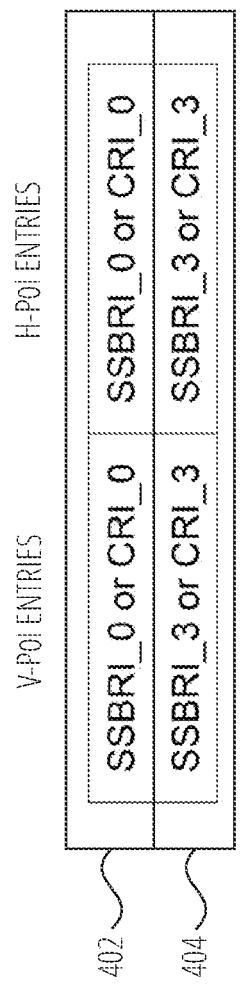
FIG. 4 illustrates a table corresponding to a pair of reporting sets provided by the UE during group based beam reporting, according to an embodiment.

FIG. 4 illustrates a table 400 corresponding to a pair of reporting sets provided by the UE during group based beam reporting, according to an embodiment. The table 400 includes the first reporting set 402 (e.g., the first row of the table 400). As shown, the first reporting set 402 indicates SSBRI_0 (or, alternatively, CRI_0) as each of its first and second TCIs. This means that the UE was able to measure an SSB (or alternatively, a CSI-RS) of a Tx beam with index 0 on both of the V-Pol and the H-Pol, as discussed above. Further, the second reporting set 404 indicates SSBRI_3 (or, alternatively, CRI_3) as each of its first and second TCIs. This means that the UE was able to measure an SSB (or, alternatively, a CSI-RS) of a Tx beam with index 3 on both of the V-Pol and the H-Pol, as discussed above.

A base station receiving a group based beam reporting message including one or more of the reporting sets with a TCI corresponding to the same Tx beam for both the first and second TCIs may be configured to understand, implicitly, that this means that the UE can receive the Tx beam on both the V-Pol and the H-Pol. Accordingly, the base station may then understand that it is free to schedule two-layer DL MIMO for the UE using the Tx beam corresponding to the TCI.

It is contemplated that analogous inferences may be provided by the UE and made by the base station relative to a TCI codepoint that contains two TC states. In this case, the US may report the two TCI states from the TCI codepoint as each of the first and second TCs of a reporting set. For example, each of the SSBRI or CRI in each TCI state may be reported as one of the first and second TCIs of the reporting set. The two layer DL MIMO may be scheduled with the TCI codepoint that includes the two TC states.

Figure 5:
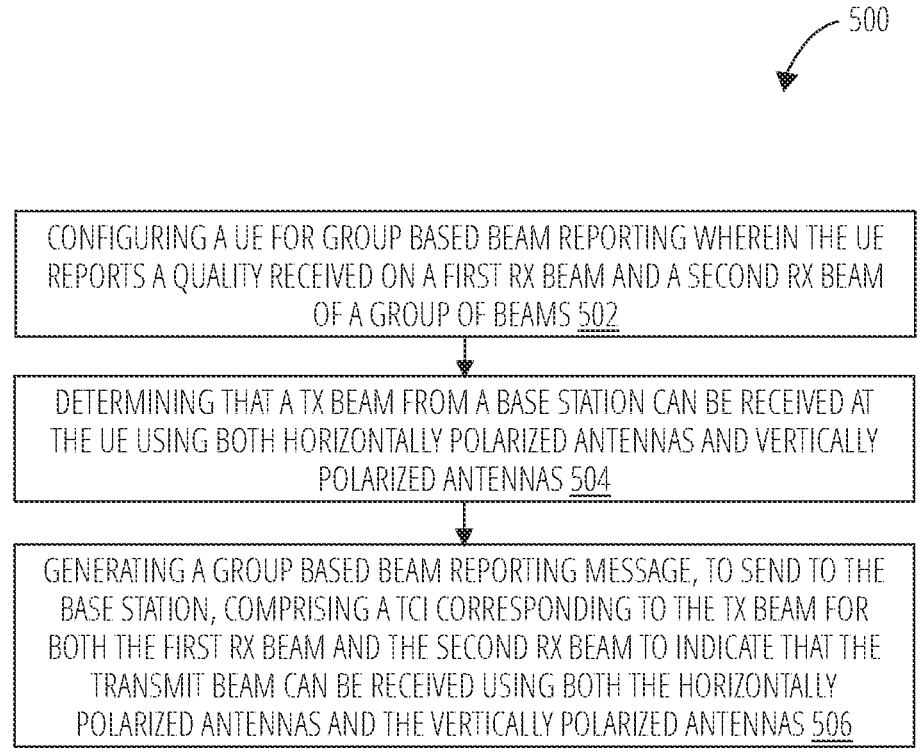
FIG. 5 illustrates a method in accordance with one embodiment.

FIG. 5 illustrates a method 500 of a UE, according to an embodiment. The method 500 includes configuring 502 a UE for group based beam reporting wherein the UE reports a quality received on a first Rx beam and a second Rx beam of a group of beams.

The method 500 further includes determining 504 that a Tx beam from a base station can be received at the UE using both horizontally polarized antennas and vertically polarized antennas.

The method 500 further includes generating 506 a group based beam reporting message, to send to the base station, comprising a TCI corresponding to the Tx beam for both the first Rx beam and the second Rx beam to indicate that the transmit beam can be received using both the horizontally polarized antennas and the vertically polarized antennas.

Figure 6:
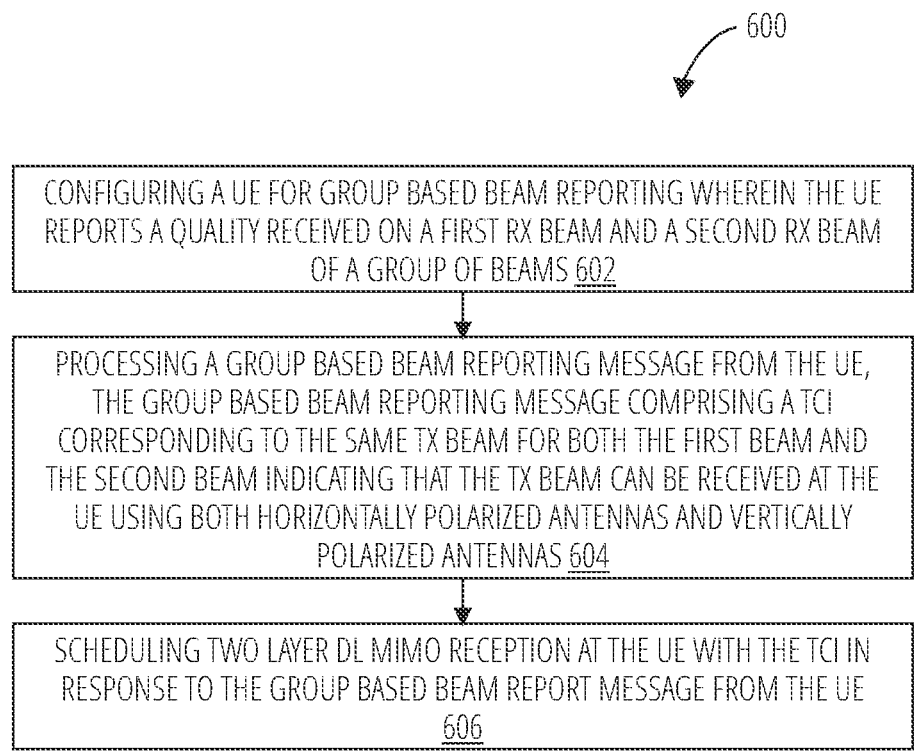
FIG. 6 illustrates a method in accordance with one embodiment.

FIG. 6 illustrates a method 600 of a base station, according to an embodiment. The method 600 includes configuring 602 a UE for group based beam reporting wherein the UE reports a quality received on a first Rx beam and a second Rx beam of a group of beams.

The method 600 further includes processing 604 a group based beam reporting message from the UE, the group based beam reporting message comprising a TCI corresponding to the same Tx beam for both the first beam and the second beam indicating that the Tx beam can be received at the UE using both horizontally polarized antennas and vertically polarized antennas.

The 700 further includes scheduling 606 two layer downlink (DL) multiple-input-multiple-output (MIMO) reception at the UE with the TCI in response to the group based beam report message from the UE.

Figure 7:
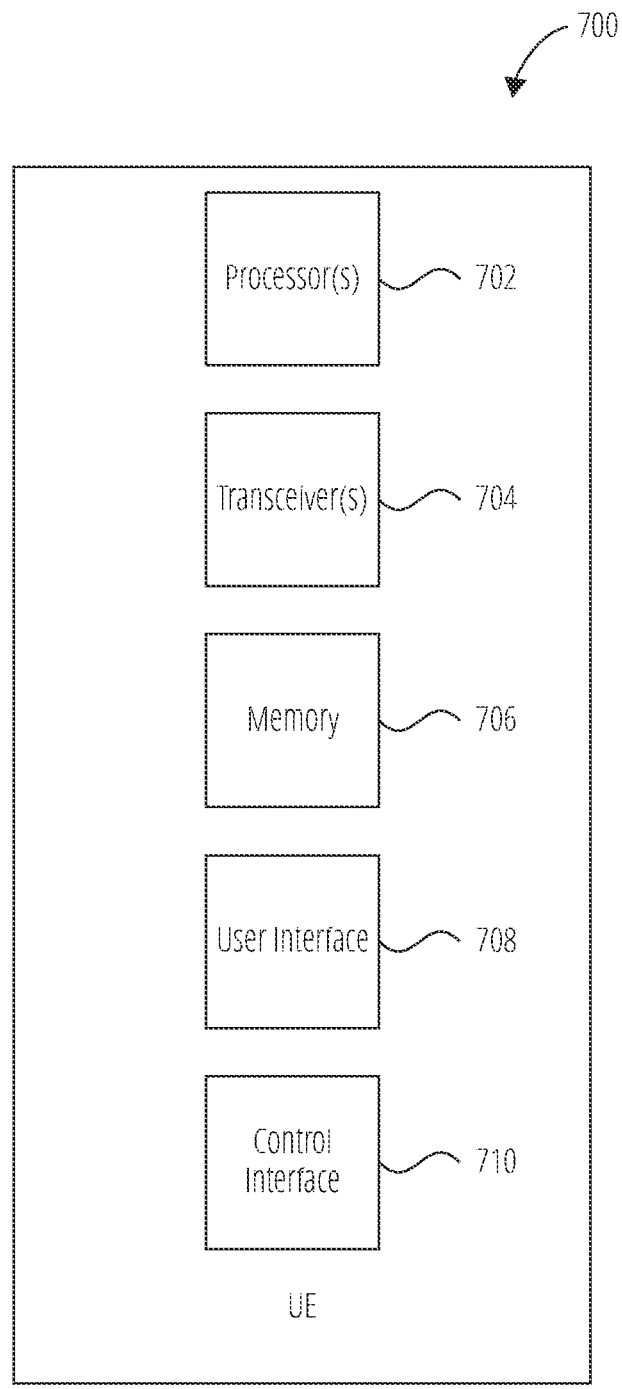
FIG. 7 illustrates a UE in accordance with one embodiment.

FIG. 7 is a block diagram of an example UE 700 configurable according to various embodiments of the present disclosure, including by execution of instructions on a computer-readable medium that correspond to any of the example methods and/or procedures described herein. The UE 700 comprises one or more processor 702, transceiver 704, memory 706, user interface 708, and control interface 710.

The one or more processor 702 may include, for example, an application processor, an audio digital signal processor, a central processing unit, and/or one or more baseband processors. Each of the one or more processor 702 may include internal memory and/or may include interface(s) to communication with external memory (including the memory 706). The internal or external memory can store software code, programs, and/or instructions for execution by the one or more processor 702 to configure and/or facilitate the UE 700 to perform various operations, including operations described herein. For example, execution of the instructions can configure the UE 700 to communicate using one or more wired or wireless communication protocols, including one or more wireless communication protocols standardized by 3GPP such as those commonly known as 5G/NR, LTE, LTE-A, UMTS, HSPA, GSM, GPRS, EDGE, etc., or any other current or future protocols that can be utilized in conjunction with the one or more transceiver 704, user interface 708, and/or control interface 710. As another example, the one or more processor 702 may execute program code stored in the memory 706 or other memory that corresponds to MAC, RLC, PDCP, and RRC layer protocols standardized by 3GPP (e.g., for NR and/or LTE). As a further example, the processor 702 may execute program code stored in the memory 706 or other memory that, together with the one or more transceiver 704, implements corresponding PHY layer protocols, such as Orthogonal Frequency Division Multiplexing (OFDM), Orthogonal Frequency Division Multiple Access (OFDMA), and Single-Carrier Frequency Division Multiple Access (SC-FDMA).

The memory 706 may comprise memory area for the one or more processor 702 to store variables used in protocols, configuration, control, and other functions of the UE 700, including operations corresponding to, or comprising, any of the example methods and/or procedures described herein. Moreover, the memory 706 may comprise non-volatile memory (e.g., flash memory), volatile memory (e.g., static or dynamic RAM), or a combination thereof. Furthermore, the memory 706 may interface with a memory slot by which removable memory cards in one or more formats (e.g., SD Card, Memory Stick, Compact Flash, etc.) can be inserted and removed.

The one or more transceiver 704 may include radio-frequency transmitter and/or receiver circuitry that facilitates the UE 700 to communicate with other equipment supporting like wireless communication standards and/or protocols. For example, the one or more transceiver 704 may include switches, mixer circuitry, amplifier circuitry, filter circuitry, and synthesizer circuitry. Such RF circuitry may include a receive signal path with circuitry to down-convert RF signals received from a front-end module (FEM) and provide baseband signals to a baseband processor of the one or more processor 702. The RF circuitry may also include a transmit signal path which may include circuitry to up-convert baseband signals provided by a baseband processor and provide RF output signals to the FEM for transmission. The FEM may include a receive signal path that may include circuitry configured to operate on RF signals received from one or more antennas, amplify the received signals and provide the amplified versions of the received signals to the RF circuitry for further processing. The FEM may also include a transmit signal path that may include circuitry configured to amplify signals for transmission provided by the RF circuitry for transmission by one or more antennas. In various embodiments, the amplification through the transmit or receive signal paths may be done solely in the RF circuitry, solely in the FEM, or in both the RF circuitry and the FEM circuitry. In some embodiments, the FEM circuitry may include a TX/RX switch to switch between transmit mode and receive mode operation.

In some exemplary embodiments, the one or more transceiver 704 includes a transmitter and a receiver that enable UE 700 to communicate with various 5G/NR networks according to various protocols and/or methods proposed for standardization by 3 GPP and/or other standards bodies. For example, such functionality can operate cooperatively with the one or more processor 702 to implement a PHY layer based on OFDM, OFDMA, and/or SC-FDMA technologies, such as described herein with respect to other figures.

The user interface 708 may take various forms depending on particular embodiments, or can be absent from the UE 700. In some embodiments, the user interface 708 includes a microphone, a loudspeaker, slidable buttons, depressible buttons, a display, a touchscreen display, a mechanical or virtual keypad, a mechanical or virtual keyboard, and/or any other user-interface features commonly found on mobile phones. In other embodiments, the UE 700 may comprise a tablet computing device including a larger touchscreen display. In such embodiments, one or more of the mechanical features of the user interface 708 may be replaced by comparable or functionally equivalent virtual user interface features (e.g., virtual keypad, virtual buttons, etc.) implemented using the touchscreen display, as familiar to persons of ordinary skill in the art. In other embodiments, the UE 700 may be a digital computing device, such as a laptop computer, desktop computer, workstation, etc. that comprises a mechanical keyboard that can be integrated, detached, or detachable depending on the particular exemplary embodiment. Such a digital computing device can also comprise a touch screen display. Many example embodiments of the UE 700 having a touch screen display are capable of receiving user inputs, such as inputs related to exemplary methods and/or procedures described herein or otherwise known to persons of ordinary skill in the art.

In some exemplary embodiments of the present disclosure, the UE 700 may include an orientation sensor, which can be used in various ways by features and functions of the UE 700. For example, the UE 700 can use outputs of the orientation sensor to determine when a user has changed the physical orientation of the UE 700's touch screen display. An indication signal from the orientation sensor can be available to any application program executing on the UE 700, such that an application program can change the orientation of a screen display (e.g., from portrait to landscape) automatically when the indication signal indicates an approximate 90-degree change in physical orientation of the device. In this manner, the application program can maintain the screen display in a manner that is readable by the user, regardless of the physical orientation of the device. In addition, the output of the orientation sensor can be used in conjunction with various exemplary embodiments of the present disclosure.

The control interface 710 may take various forms depending on particular embodiments. For example, the control interface 710 may include an RS-232 interface, an RS-485 interface, a USB interface, an HDMI interface, a Bluetooth interface, an IEEE ("Firewire") interface, an I²C interface, a PCMCIA interface, or the like. In some exemplary embodiments of the present disclosure, control interface 1260 can comprise an IEEE 802.3 Ethernet interface such as described above. In some embodiments of the present disclosure, the control interface 710 may include analog interface circuitry including, for example, one or more digital-to-analog (D/A) and/or analog-to-digital (A/D) converters.

Persons of ordinary skill in the art can recognize the above list of features, interfaces, and radio-frequency communication standards is merely exemplary, and not limiting to the scope of the present disclosure. In other words, the UE 700 may include more functionality than is shown in FIG. 7 including, for example, a video and/or still-image camera, microphone, media player and/or recorder, etc. Moreover, the one or more transceiver 704 may include circuitry for communication using additional radio-frequency communication standards including Bluetooth, GPS, and/or others. Moreover, the one or more processor 702 may execute software code stored in the memory 706 to control such additional functionality. For example, directional velocity and/or position estimates output from a GPS receiver can be available to any application program executing on the UE 700, including various exemplary methods and/or computer-readable media according to various exemplary embodiments of the present disclosure.

Figure 8:
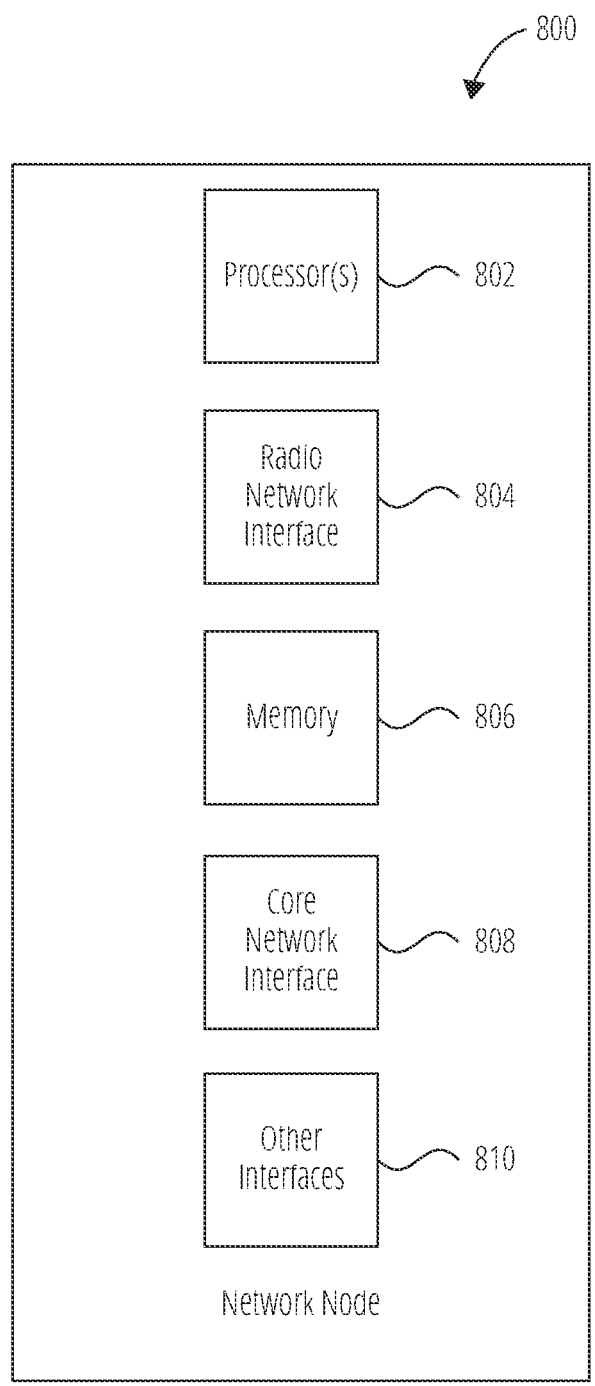
FIG. 8 illustrates a network node in accordance with one embodiment.

FIG. 8 is a block diagram of an example network node 800 configurable according to various embodiments of the present disclosure, including by execution of instructions on a computer-readable medium that correspond to any of the example methods and/or procedures described herein.

The network node 800 includes a one or more processor 802, a radio network interface 804, a memory 806, a core network interface 808, and other interfaces 810. The network node 800 may comprise, for example, a base station, eNB, gNB, access node, or component thereof.

The one or more processor 802 may include any type of processor or processing circuitry and may be configured to perform an of the methods or procedures disclosed herein. The memory 806 may store software code, programs, and/or instructions executed by the one or more processor 802 to configure the network node 800 to perform various operations, including operations described herein. For example, execution of such stored instructions can configure the network node 800 to communicate with one or more other devices using protocols according to various embodiments of the present disclosure, including one or more methods and/or procedures discussed above. Furthermore, execution of such stored instructions can also configure and/or facilitate the network node 800 to communicate with one or more other devices using other protocols or protocol layers, such as one or more of the PHY, MAC, RLC, PDCP, and RRC layer protocols standardized by 3GPP for LTE, LTE-A, and/or NR, or any other higher-layer protocols utilized in conjunction with the radio network interface 804 and the core network interface 808. By way of example and without limitation, the core network interface 808 comprise an S1 interface and the radio network interface 804 may comprise a Uu interface, as standardized by 3GPP. The memory 806 may also store variables used in protocols, configuration, control, and other functions of the network node 800. As such, the memory 806 may comprise non-volatile memory (e.g., flash memory, hard disk, etc.), volatile memory (e.g., static or dynamic RAM), network-based (e.g., "cloud") storage, or a combination thereof.

The radio network interface 804 may include transmitters, receivers, signal processors, ASICs, antennas, beamforming units, and other circuitry that enables network node 800 to communicate with other equipment such as, in some embodiments, a plurality of compatible user equipment (UE). In some embodiments, the network node 800 may include various protocols or protocol layers, such as the PHY, MAC, RLC, PDCP, and RRC layer protocols standardized by 3GPP for LTE, LTE-A, and/or 5G/NR. According to further embodiments of the present disclosure, the radio network interface 804 may include a PHY layer based on OFDM, OFDMA, and/or SC-FDMA technologies. In some embodiments, the functionality of such a PHY layer can be provided cooperatively by the radio network interface 804 and the one or more processor 802.

The core network interface 808 may include transmitters, receivers, and other circuitry that enables the network node 800 to communicate with other equipment in a core network such as, in some embodiments, circuit-switched (CS) and/or packet-switched Core (PS) networks. In some embodiments, the core network interface 808 may include the S1 interface standardized by 3GPP. In some embodiments, the core network interface 808 may include one or more interfaces to one or more SGWs, MMEs, SGSNs, GGSNs, and other physical devices that comprise functionality found in GERAN, UTRAN, E-UTRAN, and CDMA2000 core networks that are known to persons of ordinary skill in the art. In some embodiments, these one or more interfaces may be multiplexed together on a single physical interface. In some embodiments, lower layers of the core network interface 808 may include one or more of asynchronous transfer mode (ATM), Internet Protocol (IP)-over-Ethernet, SDH over optical fiber, T1/E1/PDH over a copper wire, microwave radio, or other wired or wireless transmission technologies known to those of ordinary skill in the art.

The other interfaces 810 may include transmitters, receivers, and other circuitry that enables the network node 800 to communicate with external networks, computers, databases, and the like for purposes of operations, administration, and maintenance of the network node 800 or other network equipment operably connected thereto.

Example System Architecture

In certain embodiments, 5G System architecture supports data connectivity and services enabling deployments to use techniques such as Network Function Virtualization and Software Defined Networking. The 5G System architecture may leverage service-based interactions between Control Plane Network Functions. Separating User Plane functions from the Control Plane functions allows independent scalability, evolution, and flexible deployments (e.g., centralized location or distributed (remote) location). Modularized function design allows for function re-use and may enable flexible and efficient network slicing. A Network Function and its Network Function Services may interact with another NF and its Network Function Services directly or indirectly via a Service Communication Proxy. Another intermediate function may help route Control Plane messages. The architecture minimizes dependencies between the AN and the CN. The architecture may include a converged core network with a common AN-CN interface that integrates different Access Types (e.g., 3GPP access and non-3GPP access). The architecture may also support a unified authentication framework, stateless NFs where the compute resource is decoupled from the storage resource, capability exposure, concurrent access to local and centralized services (to support low latency services and access to local data networks, User Plane functions can be deployed close to the AN), and/or roaming with both Home routed traffic as well as Local breakout traffic in the visited PLMN.

The 5G architecture may be defined as service-based and the interaction between network functions may include a service-based representation, where network functions (e.g., AMF) within the Control Plane enable other authorized network functions to access their services. The service-based representation may also include point-to-point reference points. A reference point representation may also be used to show the interactions between the NF services in the network functions described by point-to-point reference point (e.g., N11) between any two network functions (e.g., AMF and SMF).

Figure 9:
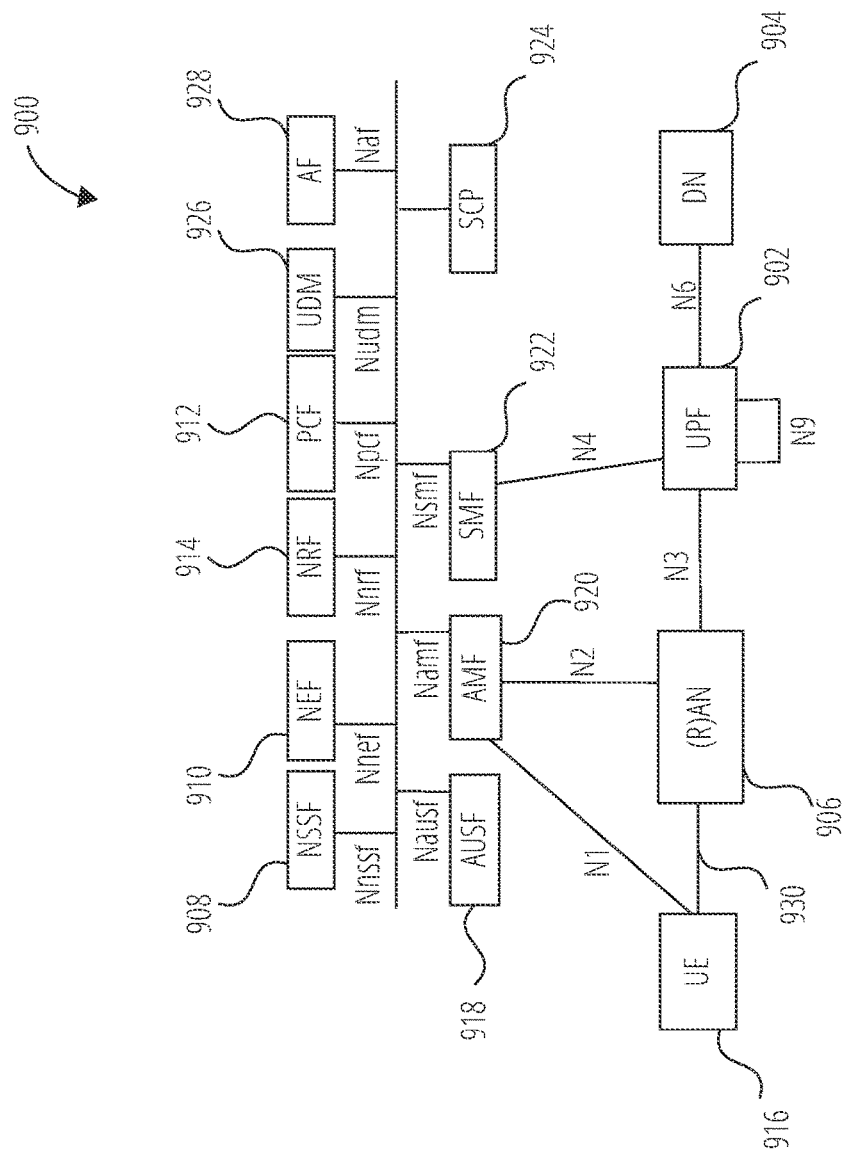
FIG. 9 illustrates an example service based architecture in accordance with certain embodiments.

FIG. 9 illustrates a service based architecture 900 in 5GS according to one embodiment. As described in 3GPP TS 23.501, the service based architecture 900 comprises NFs such as an NSSF 908, a NEF 910, an NRF 914, a PCF 912, a UDM 926, an AUSF 918, an AMF 920, an SMF 922, for communication with a UE 916, a (R)AN 906, a UPF 902, and a DN 904. The NFs and NF services can communicate directly, referred to as Direct Communication, or indirectly via a SCP 924, referred to as Indirect Communication. FIG. 9 also shows corresponding service-based interfaces including Nutm, Naf, Nudm, Npcf, Nsmf, Nnrf, Namf, Nnef, Nnssf, and Nausf, as well as reference points N1, N2, N3, N4, and N6. A few example functions provided by the NFs shown in FIG. 9 are described below.

The NSSF 908 supports functionality such as: selecting the set of Network Slice instances serving the UE; determining the Allowed NSSAI and, if needed, mapping to the Subscribed S-NSSAIs; determining the Configured NSSAI and, if needed, the mapping to the Subscribed S-NSSAIs; and/or determining the AMF Set to be used to serve the UE, or, based on configuration, a list of candidate AMF(s), possibly by querying the NRF.

The NEF 910 supports exposure of capabilities and events. NF capabilities and events may be securely exposed by the NEF 910 (e.g., for 3rd party, Application Functions, and/or Edge Computing). The NEF 910 may store/retrieve information as structured data using a standardized interface (Nudr) to a UDR. The NEF 910 may also secure provision of information from an external application to 3GPP network and may provide for the Application Functions to securely provide information to the 3GPP network (e.g., expected UE behavior, 5GLAN group information, and service specific information), wherein the NEF 910 may authenticate and authorize and assist in throttling the Application Functions. The NEF 910 may provide translation of internal-external information by translating between information exchanged with the AF 928 and information exchanged with the internal network function. For example, the NEF 910 translates between an AF-Service-Identifier and internal 5G Core information such as DNN and S-NSSAI. The NEF 910 may handle masking of network and user sensitive information to external AF's according to the network policy. The NEF 910 may receive information from other network functions (based on exposed capabilities of other network functions), and stores the received information as structured data using a standardized interface to a UDR. The stored information can be accessed and re-exposed by the NEF 910 to other network functions and Application Functions, and used for other purposes such as analytics. For external exposure of services related to specific UE(s), the NEF 910 may reside in the HPLMN. Depending on operator agreements, the NEF 910 in the HPLMN may have interface(s) with NF(s) in the VPLMN. When a UE is capable of switching between EPC and 5GC, an SCEF+NEF may be used for service exposure.

The NRF 914 supports service discovery function by receiving an NF Discovery Request from an NF instance or SCP and providing the information of the discovered NF instances to the NF instance or SCP. The NRF 914 may also support P-CSCF discovery (specialized case of AF discovery by SMF), maintains the NF profile of available NF instances and their supported services, and/or notify about newly registered/updated/deregistered NF instances along with its NF services to the subscribed NF service consumer or SCP. In the context of Network Slicing, based on network implementation, multiple NRFs can be deployed at different levels such as a PLMN level (the NRF is configured with information for the whole PLMN), a shared-slice level (the NRF is configured with information belonging to a set of Network Slices), and/or a slice-specific level (the NRF is configured with information belonging to an S-NSSAI). In the context of roaming, multiple NRFs may be deployed in the different networks, wherein the NRF(s) in the Visited PLMN (known as the vNRF) are configured with information for the visited PLMN, and wherein the NRF(s) in the Home PLMN (known as the hNRF) are configured with information for the home PLMN, referenced by the vNRF via an N27 interface.

The PCF 912 supports a unified policy framework to govern network behavior. The PCF 912 provides policy rules to Control Plane function(s) to enforce them. The PCF 912 accesses subscription information relevant for policy decisions in a Unified Data Repository (UDR). The PCF 912 may access the UDR located in the same PLMN as the PCF.

The UDM 926 supports generation of 3GPP AKA Authentication Credentials, User Identification Handling (e.g., storage and management of SUPI for each subscriber in the 5G system), de-concealment of a privacy-protected subscription identifier (SUCI), access authorization based on subscription data (e.g., roaming restrictions), UE's Serving NF Registration Management (e.g., storing serving AMF for UE, storing serving SMF for UE's PDU Session), service/session continuity (e.g., by keeping SMF/DNN assignment of ongoing sessions, MT-SMS delivery, Lawful Intercept Functionality (especially in outbound roaming cases where a UDM is the only point of contact for LI), subscription management, SMS management, 5GLAN group management handling, and/or external parameter provisioning (Expected UE Behavior parameters or Network Configuration parameters). To provide such functionality, the UDM 926 uses subscription data (including authentication data) that may be stored in a UDR, in which case a UDM implements the application logic and may not require an internal user data storage and several different UDMs may serve the same user in different transactions. The UDM 926 may be located in the HPLMN of the subscribers it serves, and may access the information of the UDR located in the same PLMN.

The AUSF 918 supports authentication for 3GPP access and untrusted non-3GPP access. The AUSF 918 may also provide support for Network Slice-Specific Authentication and Authorization.

The AMF 920 supports termination of RAN CP interface (N2), termination of NAS (N1) for NAS ciphering and integrity protection, registration management, connection management, reachability management, Mobility Management, lawful intercept (for AMF events and interface to LI System), transport for SM messages between UE and SMF, transparent proxy for routing SM messages, Access Authentication, Access Authorization, transport for SMS messages between UE and SMSF, SEAF, Location Services management for regulatory services, transport for Location Services messages between UE and LMF as well as between RAN and LMF, EPS Bearer ID allocation for interworking with EPS, UE mobility event notification, Control Plane CIoT 5GS Optimization, User Plane CIoT 5GS Optimization, provisioning of external parameters (Expected UE Behavior parameters or Network Configuration parameters), and/or Network Slice-Specific Authentication and Authorization. Some or all of the AMF functionalities may be supported in a single instance of the AMF 920. Regardless of the number of Network functions, in certain embodiments there is only one NAS interface instance per access network between the UE and the CN, terminated at one of the Network functions that implements at least NAS security and Mobility Management. The AMF 920 may also include policy related functionalities.

In addition to the functionalities described above, the AMF 920 may include the following functionality to support non-3GPP access networks: support of N2 interface with N3IWF/TNGF, over which some information (e.g., 3GPP Cell Identification) and procedures (e.g., Handover related) defined over 3GPP access may not apply, and non-3GPP access specific information may be applied that do not apply to 3GPP accesses; support of NAS signaling with a UE over N3IWF/TNGF, wherein some procedures supported by NAS signaling over 3GPP access may be not applicable to untrusted non-3GPP (e.g., Paging) access; support of authentication of UEs connected over N3IWF/TNGF; management of mobility, authentication, and separate security context state(s) of a UE connected via a non-3GPP access or connected via a 3GPP access and a non-3GPP access simultaneously; support a co-ordinated RM management context valid over a 3GPP access and a Non 3GPP access; and/or support dedicated CM management contexts for the UE for connectivity over non-3GPP access. Not all of the above functionalities may be required to be supported in an instance of a Network Slice.

The SMF 922 supports Session Management (e.g., Session Establishment, modify and release, including tunnel maintain between UPF and AN node), UE IP address allocation & management (including optional Authorization) wherein the UE IP address may be received from a UPF or from an external data network, DHCPv4 (server and client) and DHCPv6 (server and client) functions, functionality to respond to Address Resolution Protocol requests and/or IPv6 Neighbor Solicitation requests based on local cache information for the Ethernet PDUs (e.g., the SMF responds to the ARP and/or the IPv6 Neighbor Solicitation Request by providing the MAC address corresponding to the IP address sent in the request), selection and control of User Plane functions including controlling the UPF to proxy ARP or IPv6 Neighbor Discovery or to forward all ARP/IPv6 Neighbor Solicitation traffic to the SMF for Ethernet PDU Sessions, traffic steering configuration at the UPF to route traffic to proper destinations, 5G VN group management (e.g., maintain the topology of the involved PSA UPFs, establish and release the N19 tunnels between PSA UPFs, configure traffic forwarding at UPF to apply local switching, and/or N6-based forwarding or N19-based forwarding), termination of interfaces towards Policy control functions, lawful intercept (for SM events and interface to LI System), charging data collection and support of charging interfaces, control and coordination of charging data collection at the UPF, termination of SM parts of NAS messages, Downlink Data Notification, Initiator of AN specific SM information sent via AMF over N2 to AN, determination of SSC mode of a session, Control Plane CIoT 5GS Optimization, header compression, acting as I-SMF in deployments where I-SMF can be inserted/removed/relocated, provisioning of external parameters (Expected UE Behavior parameters or Network Configuration parameters). P-CSCF discovery for IMS services, roaming functionality (e.g., handle local enforcement to apply QoS SLAs (VPLMN), charging data collection and charging interface (VPLMN), and/or lawful intercept (in VPLMN for SM events and interface to LI System), interaction with external DN for transport of signaling for PDU Session authentication/authorization by external DN, and/or instructing UPF and NG-RAN to perform redundant transmission on N3/N9 interfaces. Some or all of the SMF functionalities may be supported in a single instance of a SMF. However, in certain embodiments, not all of the functionalities are required to be supported in an instance of a Network Slice. In addition to the functionalities, the SMF 922 may include policy related functionalities.

The SCP 924 includes one or more of the following functionalities: Indirect Communication; Delegated Discovery; message forwarding and routing to destination NF/NF services: communication security (e.g., authorization of the NF Service Consumer to access the NF Service Producer's API), load balancing, monitoring, overload control, etc.; and/or optionally interact with the UDR, to resolve the UDM Group ID/UDR Group ID/AUSF Group ID/PCF Group ID/CHF Group ID/HSS Group ID based on UE identity (e.g., SUPI or IMPI/IMPU). Some or all of the SCP functionalities may be supported in a single instance of an SCP. In certain embodiments, the SCP 924 may be deployed in a distributed manner and/or more than one SCP can be present in the communication path between NF Services. SCPs can be deployed at PLMN level, shared-slice level, and slice-specific level. It may be left to operator deployment to ensure that SCPs can communicate with relevant NRFs.

The UE 916 may include a device with radio communication capabilities. For example, the UE 916 may comprise a smartphone (e.g., handheld touchscreen mobile computing devices connectable to one or more cellular networks). The UE 916 may also comprise any mobile or non-mobile computing device, such as Personal Data Assistants (PDAs), pagers, laptop computers, desktop computers, wireless handsets, or any computing device including a wireless communications interface. A UE may also be referred to as a client, mobile, mobile device, mobile terminal, user terminal, mobile unit, mobile station, mobile user, subscriber, user, remote station, access agent, user agent, receiver, radio equipment, reconfigurable radio equipment, or reconfigurable mobile device. The UE 916 may comprise an IoT UE, which can comprise a network access layer designed for low-power IoT applications utilizing short-lived UE connections. An IoT UE can utilize technologies (e.g., M2M, MTC, or mMTC technology) for exchanging data with an MTC server or device via a PLMN, other UEs using ProSe or D2D communications, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure). The IoT UEs may execute background applications (e.g., keep-alive messages, status updates, etc.) to facilitate the connections of the IoT network.

The UE 916 may be configured to connect or communicatively couple with the (R)AN 906 through a radio interface 930, which may be a physical communication interface or layer configured to operate with cellular communication protocols such as a GSM protocol, a CDMA network protocol, a Push-to-Talk (PTT) protocol, a PTT over Cellular (POC) protocol, a UMTS protocol, a 3GPP LTE protocol, a 5G protocol, a NR protocol, and the like. For example, the UE 916 and the (R)AN 906 may use a Uu interface (e.g., an LTE-Uu interface) to exchange control plane data via a protocol stack comprising a PHY layer, an MAC layer, an RLC layer, a PDCP layer, and an RRC layer. A DL transmission may be from the (R)AN 906 to the UE 916 and a UL transmission may be from the UE 916 to the (R)AN 906. The UE 916 may further use a sidelink to communicate directly with another UE (not shown) for D2D, P2P, and/or ProSe communication. For example, a ProSe interface may comprise one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The (R)AN 906 can include one or more access nodes, which may be referred to as base stations (BSs), NodeBs, evolved NodeBs (eNBs), next Generation NodeBs (gNB), RAN nodes, controllers, transmission reception points (TRPs), and so forth, and can comprise ground stations (e.g., terrestrial access points) or satellite stations providing coverage within a geographic area (e.g., a cell). The (R)AN 906 may include one or more RAN nodes for providing macrocells, picocells, femtocells, or other types of cells. A macrocell may cover a relatively large geographic area (e.g., several kilometers in radius) and may allow unrestricted access by UEs with service subscription. A picocell may cover a relatively small geographic area and may allow unrestricted access by UEs with service subscription. A femtocell may cover a relatively small geographic area (e.g., a home) and may allow restricted access by UEs having an association with the femtocell (e.g., UEs in a Closed Subscriber Group (CSG). UEs for users in the home, etc.).

Although not shown, multiple RAN nodes (such as the (R)AN 906) may be used, wherein an Xn interface is defined between two or more nodes. In some implementations, the Xn interface may include an Xn user plane (Xn-U) interface and an Xn control plane (Xn-C) interface. The Xn-U may provide non-guaranteed delivery of user plane PDUs and support/provide data forwarding and flow control functionality. The Xn-C may provide management and error handling functionality, functionality to manage the Xn-C interface; mobility support for the UE 916 in a connected mode (e.g., CM-CONNECTED) including functionality to manage the UE mobility for connected mode between one or more (R)AN nodes. The mobility support may include context transfer from an old (source) serving (R)AN node to new (target) serving (R)AN node: and control of user plane tunnels between old (source) serving (R)AN node to new (target) serving (R)AN node.

The UPF 902 may act as an anchor point for intra-RAT and inter-RAT mobility, an external PDU session point of interconnect to the DN 904, and a branching point to support multi-homed PDU session. The UPF 902 may also perform packet routing and forwarding, packet inspection, enforce user plane part of policy rules, lawfully intercept packets (UP collection); traffic usage reporting, perform QoS handling for user plane (e.g. packet filtering, gating. UL/DL rate enforcement), perform Uplink Traffic verification (e.g., SDF to QoS flow mapping), transport level packet marking in the uplink and downlink, and downlink packet buffering and downlink data notification triggering. The UPF 902 may include an uplink classifier to support routing traffic flows to a data network. The DN 904 may represent various network operator services, Internet access, or third party services. The DN 904 may include, for example, an application server.

Figure 10:
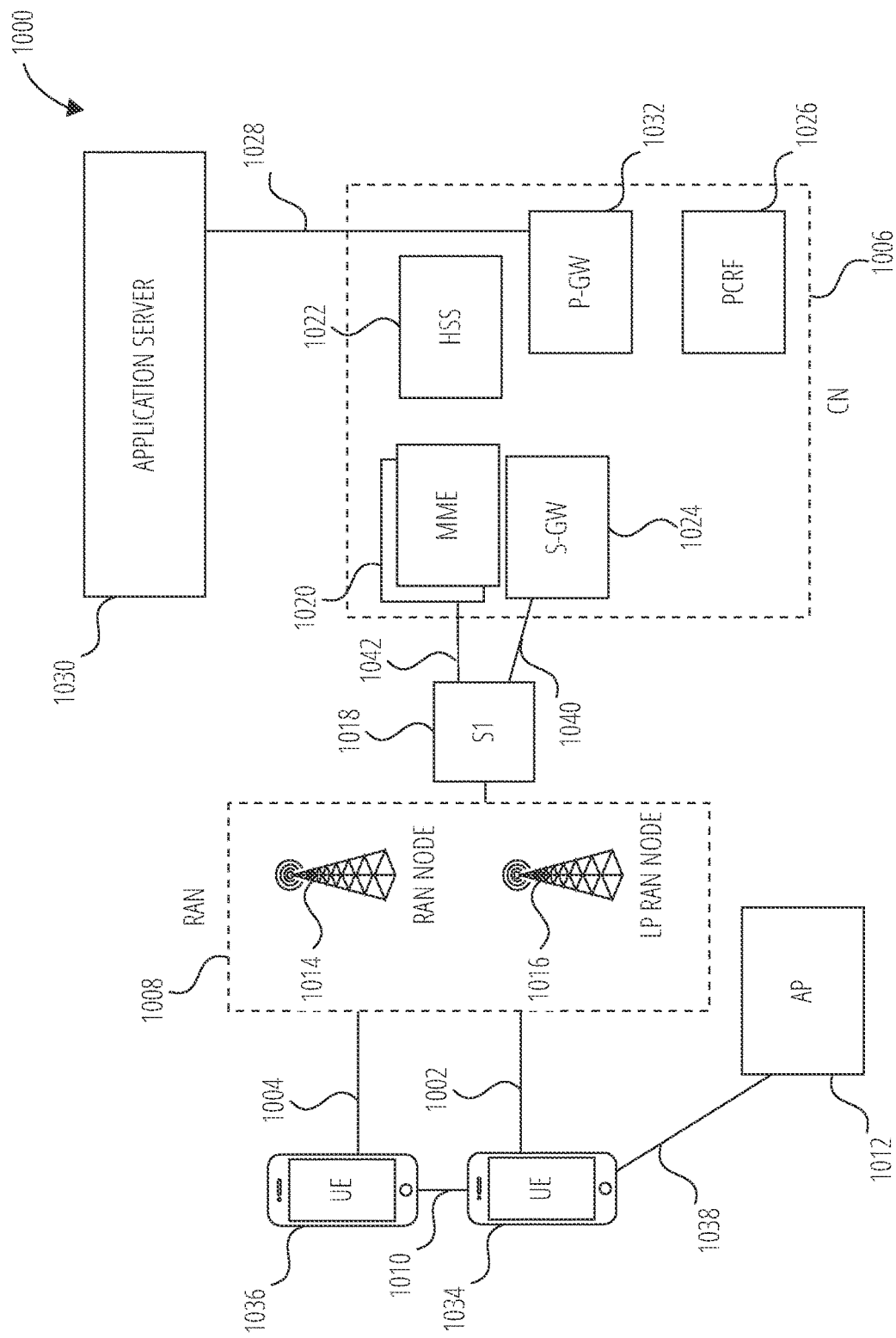
FIG. 10 illustrates a system in accordance with one embodiment.

FIG. 10 illustrates an architecture of a system 1000 of a network in accordance with some embodiments. The system 1000 includes one or more user equipment (UE), shown in this example as a UE 1036 and a UE 1034. The UE 1036 and the UE 1034 are illustrated as smartphones (e.g., handheld touchscreen mobile computing devices connectable to one or more cellular networks), but may also comprise any mobile or non-mobile computing device, such as Personal Data Assistants (PDAs), pagers, laptop computers, desktop computers, wireless handsets, or any computing device including a wireless communications interface.

In some embodiments, any of the UE 1036 and the UE 1034 can comprise an Internet of Things (IoT) UE, which can comprise a network access layer designed for low-power IoT applications utilizing short-lived UE connections. An IoT UE can utilize technologies such as machine-to-machine (M2M) or machine-type communications (MTC) for exchanging data with an MTC server or device via a public land mobile network (PLMN), Proximity-Based Service (ProSe) or device-to-device (D2D) communication, sensor networks, or IoT networks. The M2M or MTC exchange of data may be a machine-initiated exchange of data. An IoT network describes interconnecting IoT UEs, which may include uniquely identifiable embedded computing devices (within the Internet infrastructure), with short-lived connections. The IoT UEs may execute background applications (e.g., keep-alive messages, status updates, etc.) to facilitate the connections of the IoT network.

The UE 1036 and the UE 1034 may be configured to connect, e.g., communicatively couple, with a radio access network (RAN), shown as RAN 1008. The RAN 1008 may be, for example, an Evolved Universal Mobile Telecommunications System (UMTS) Terrestrial Radio Access Network (E-UTRAN), a NextGen RAN (NG RAN), or some other type of RAN. The UE 1036 and the UE 1034 utilize connection 1004 and connection 1002, respectively, each of which comprises a physical communications interface or layer (discussed in further detail below); in this example, the connection 1004 and the connection 1002 are illustrated as an air interface to enable communicative coupling, and can be consistent with cellular communications protocols, such as a Global System for Mobile Communications (GSM) protocol, a code-division multiple access (CDMA) network protocol, a Push-to-Talk (PTT) protocol, a PTT over Cellular (POC) protocol, a Universal Mobile Telecommunications System (UMTS) protocol, a 3GPP Long Term Evolution (LTE) protocol, a fifth generation (5G) protocol, a New Radio (NR) protocol, and the like.

In this embodiment, the UE 1036 and the UE 1034 may further directly exchange communication data via a ProSe interface 1010. The ProSe interface 1010 may alternatively be referred to as a sidelink interface comprising one or more logical channels, including but not limited to a Physical Sidelink Control Channel (PSCCH), a Physical Sidelink Shared Channel (PSSCH), a Physical Sidelink Discovery Channel (PSDCH), and a Physical Sidelink Broadcast Channel (PSBCH).

The UE 1034 is shown to be configured to access an access point (AP), shown as AP 1012, via connection 1038. The connection 1038 can comprise a local wireless connection, such as a connection consistent with any IEEE 802.11 protocol, wherein the AP 1012 would comprise a wireless fidelity (WiFi®) router. In this example, the AP 1012 may be connected to the Internet without connecting to the core network of the wireless system (described in further detail below).

The RAN 1008 can include one or more access nodes that enable the connection 1004 and the connection 1002. These access nodes (ANs) can be referred to as base stations (BSs), NodeBs, evolved NodeBs (eNBs), next Generation NodeBs (gNB), RAN nodes, and so forth, and can comprise ground stations (e.g., terrestrial access points) or satellite stations providing coverage within a geographic area (e.g., a cell).

The RAN 1008 may include one or more RAN nodes for providing macrocells, e.g., macro RAN node 1014, and one or more RAN nodes for providing femtocells or picocells (e.g., cells having smaller coverage areas, smaller user capacity, or higher bandwidth compared to macrocells), e.g., a low power (LP) RAN node such as LP RAN node 1016.

Any of the macro RAN node 1014 and the LP RAN node 1016 can terminate the air interface protocol and can be the first point of contact for the UE 1036 and the UE 1034. In some embodiments, any of the macro RAN node 1014 and the LP RAN node 1016 can fulfill various logical functions for the RAN 1008 including, but not limited to, radio network controller (RNC) functions such as radio bearer management, uplink and downlink dynamic radio resource management and data packet scheduling, and mobility management.

In accordance with some embodiments, the UE 1036 and the UE 1034 can be configured to communicate using Orthogonal Frequency-Division Multiplexing (OFDM) communication signals with each other or with any of the macro RAN node 1014 and the LP RAN node 1016 over a multicarrier communication channel in accordance various communication techniques, such as, but not limited to, an Orthogonal Frequency-Division Multiple Access (OFDMA) communication technique (e.g., for downlink communications) or a Single Carrier Frequency Division Multiple Access (SC-FDMA) communication technique (e.g., for uplink and ProSe or sidelink communications), although the scope of the embodiments is not limited in this respect. The OFDM signals can comprise a plurality of orthogonal subcarriers.

In some embodiments, a downlink resource grid can be used for downlink transmissions from any of the macro RAN node 1014 and the LP RAN node 1016 to the UE 1036 and the UE 1034, while uplink transmissions can utilize similar techniques. The grid can be a time-frequency grid, called a resource grid or time-frequency resource grid, which is the physical resource in the downlink in each slot. Such a time-frequency plane representation is a common practice for OFDM systems, which makes it intuitive for radio resource allocation. Each column and each row of the resource grid corresponds to one OFDM symbol and one OFDM subcarrier, respectively. The duration of the resource grid in the time domain corresponds to one slot in a radio frame. The smallest time-frequency unit in a resource grid is denoted as a resource element. Each resource grid comprises a number of resource blocks, which describe the mapping of certain physical channels to resource elements. Each resource block comprises a collection of resource elements; in the frequency domain, this may represent the smallest quantity of resources that currently can be allocated. There are several different physical downlink channels that are conveyed using such resource blocks.

The physical downlink shared channel (PDSCH) may carry user data and higher-layer signaling to the UE 1036 and the UE 1034. The physical downlink control channel (PDCCH) may carry information about the transport format and resource allocations related to the PDSCH channel, among other things. It may also inform the UE 1036 and the UE 1034 about the transport format, resource allocation, and H-ARQ (Hybrid Automatic Repeat Request) information related to the uplink shared channel. Typically, downlink scheduling (assigning control and shared channel resource blocks to the UE 1034 within a cell) may be performed at any of the macro RAN node 1014 and the LP RAN node 1016 based on channel quality information fed back from any of the UE 1036 and UE 1034. The downlink resource assignment information may be sent on the PDCCH used for (e.g., assigned to) each of the UE 1036 and the UE 1034.

The PDCCH may use control channel elements (CCEs) to convey the control information. Before being mapped to resource elements, the PDCCH complex-valued symbols may first be organized into quadruplets, which may then be permuted using a sub-block interleaver for rate matching. Each PDCCH may be transmitted using one or more of these CCEs, where each CCE may correspond to nine sets of four physical resource elements known as resource element groups (REGs). Four Quadrature Phase Shift Keying (QPSK) symbols may be mapped to each REG. The PDCCH can be transmitted using one or more CCEs, depending on the size of the downlink control information (DCI) and the channel condition. There can be four or more different PDCCH formats defined in LTE with different numbers of CCEs (e.g., aggregation level, L=1, 2, 4, or 8).

Some embodiments may use concepts for resource allocation for control channel information that are an extension of the above-described concepts. For example, some embodiments may utilize an enhanced physical downlink control channel (EPDCCH) that uses PDSCH resources for control information transmission. The EPDCCH may be transmitted using one or more enhanced the control channel elements (ECCEs). Similar to above, each ECCE may correspond to nine sets of four physical resource elements known as enhanced resource element groups (EREGs). An ECCE may have other numbers of EREGs in some situations.

The RAN 1008 is communicatively coupled to a core network (CN), shown as CN 1006—via an S1 interface 1018. In embodiments, the CN 1006 may be an evolved packet core (EPC) network, a NextGen Packet Core (NPC) network, or some other type of CN. In this embodiment the S1 interface 1018 is split into two parts: the S1-U interface 1040, which carries traffic data between the macro RAN node 1014 and the LP RAN node 1016 and a serving gateway (S-GW), shown as S-GW 1024, and an S1-mobility management entity (MME) interface, shown as S1-MME interface 1042, which is a signaling interface between the macro RAN node 1014 and LP RAN node 1016 and the MME(s) 1020.

In this embodiment, the CN 1006 comprises the MME(s) 1020, the S-GW 1024, a Packet Data Network (PDN) Gateway (P-GW) (shown as P-GW 1032), and a home subscriber server (HSS) (shown as HSS 1022). The MME(s) 1020 may be similar in function to the control plane of legacy Serving General Packet Radio Service (GPRS) Support Nodes (SGSN). The MME(s) 1020 may manage mobility aspects in access such as gateway selection and tracking area list management. The HSS 1022 may comprise a database for network users, including subscription-related information to support the network entities' handling of communication sessions. The CN 1006 may comprise one or several HSS 1022, depending on the number of mobile subscribers, on the capacity of the equipment, on the organization of the network, etc. For example, the HSS 1022 can provide support for routing/roaming, authentication, authorization, naming/addressing resolution, location dependencies, etc.

The S-GW 1024 may terminate the S1 interface 322 towards the RAN 1008, and routes data packets between the RAN 1008 and the CN 1006. In addition, the S-GW 1024 may be a local mobility anchor point for inter-RAN node handovers and also may provide an anchor for inter-3GPP mobility. Other responsibilities may include lawful intercept, charging, and some policy enforcement.

The P-GW 1032 may terminate an SGi interface toward a PDN. The P-GW 1032 may route data packets between the CN 1006 (e.g., an EPC network) and external networks such as a network including the application server 1030 (alternatively referred to as application function (AF)) via an Internet Protocol (IP) interface (shown as IP communications interface 1028). Generally, an application server 1030 may be an element offering applications that use IP bearer resources with the core network (e.g., UMTS Packet Services (PS) domain, LTE PS data services, etc.). In this embodiment, the P-GW 1032 is shown to be communicatively coupled to an application server 1030 via an IP communications interface 1028. The application server 1030 can also be configured to support one or more communication services (e.g., Voice-over-Internet Protocol (VoIP) sessions, PTT sessions, group communication sessions, social networking services, etc.) for the UE 1036 and the UE 1034 via the CN 1006.

The P-GW 1032 may further be a node for policy enforcement and charging data collection. A Policy and Charging Enforcement Function (PCRF) (shown as PCRF 1026) is the policy and charging control element of the CN 1006. In a non-roaming scenario, there may be a single PCRF in the Home Public Land Mobile Network (HPLMN) associated with a UE's Internet Protocol Connectivity Access Network (IP-CAN) session. In a roaming scenario with local breakout of traffic, there may be two PCRFs associated with a UE's IP-CAN session: a Home PCRF (H-PCRF) within a HPLMN and a Visited PCRF (V-PCRF) within a Visited Public Land Mobile Network (VPLMN). The PCRF 1026 may be communicatively coupled to the application server 1030 via the P-GW 1032. The application server 1030 may signal the PCRF 1026 to indicate a new service flow and select the appropriate Quality of Service (QoS) and charging parameters. The PCRF 1026 may provision this rule into a Policy and Charging Enforcement Function (PCEF) (not shown) with the appropriate traffic flow template (TFT) and QoS class of identifier (QCI), which commences the QoS and charging as specified by the application server 1030.

FIG. 11 is a block diagram illustrating components 1100, according to some example embodiments, able to read instructions from a machine-readable or computer-readable medium (e.g., a non-transitory machine-readable storage medium) and perform any one or more of the methodologies discussed herein. Specifically, FIG. 11 shows a diagrammatic representation of hardware resources 1102 including one or more processors 1106 (or processor cores), one or more memory/storage devices 1114, and one or more communication resources 1124, each of which may be communicatively coupled via a bus 1116. For embodiments where node virtualization (e.g., NFV) is utilized, a hypervisor 1122 may be executed to provide an execution environment for one or more network slices/sub-slices to utilize the hardware resources 1102.

The processors 1106 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 1108 and a processor 1110.

The memory/storage devices 1114 may include main memory, disk storage, or any suitable combination thereof. The memory/storage devices 1114 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 1124 may include interconnection or network interface components or other suitable devices to communicate with one or more peripheral devices 1104 or one or more databases 1120 via a network 1118. For example, the communication resources 1124 may include wired communication components (e.g., for coupling via a Universal Serial Bus (USB)), cellular communication components, NFC components, Bluetooth® components (e.g., Bluetooth® Low Energy), Wi-Fi® components, and other communication components.

Instructions 1112 may comprise software, a program, an application, an applet, an app, or other executable code for causing at least any of the processors 1106 to perform any one or more of the methodologies discussed herein. The instructions 1112 may reside, completely or partially, within at least one of the processors 1106 (e.g., within the processor's cache memory), the memory/storage devices 1114, or any suitable combination thereof. Furthermore, any portion of the instructions 1112 may be transferred to the hardware resources 1102 from any combination of the peripheral devices 1104 or the databases 1120. Accordingly, the memory of the processors 1106, the memory/storage devices 1114, the peripheral devices 1104, and the databases 1120 are examples of computer-readable and machine-readable media.

For one or more embodiments, at least one of the components set forth in one or more of the preceding figures may be configured to perform one or more operations, techniques, processes, and/or methods as set forth in the Example Section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLE SECTION

The following examples pertain to further embodiments.

Example 1 is a method for wireless communications by a user equipment (UE), the method comprising: determining that one or more of a current UE data rate and a current UE power usage are different from, respectively, a preferred UE data rate and a preferred UE power usage; dynamically determining a preferred number of receive (Rx) beams to use for an Rx beam sweep at the UE based on one or more of the preferred data rate and the preferred power usage, wherein the preferred number of Rx beams is greater than eight; and signaling, to a base station, the preferred number of Rx beams.

Example 2 is the method of Example 1, wherein the preferred number of Rx beams is a number selected from a group comprising 12, 16, 20, 24, 28, 32, 36, 40, 44, 48, 52, 56, 60, and 64.

Example 3 is the method of any of Examples 1-2, wherein the preferred number of Rx beams is signaled to the base station as part of one of a medium access control (MAC) control element (MAC-CE), a Layer 1 measurement report, and a Layer 3 measurement report.

Example 4 is the method of any of Examples 1-3, wherein the preferred number of Rx beams is a number present on a list of preferred numbers of Rx beams previously sent to the base station by the UE.

Example 5 is the method of any of Examples 1-4, further comprising signaling, to the base station, that the UE is configured perform the Rx beam sweep using one of a vertical polarization, a horizontal polarization, and both the vertical polarization and the horizontal polarization.

Example 6 is the method of Example 5, wherein the signaling that the UE is configured to perform the Rx beam sweep using one of the vertical polarization, the horizontal polarization, and both the vertical polarization and the horizontal polarization is included in one of a radio resource control (RRC) message, a MAC-CE, and uplink control information (UCI).

Example 7 is a computing apparatus of a user equipment (UE), comprising: memory; and processing circuitry connected with the memory and configured to: determine that one or more of a current UE data rate and a current UE power usage are different from, respectively, a preferred UE data rate and a preferred UE power usage; dynamically determine a preferred number of receive (Rx) beams to use for an Rx beam sweep at the UE based on one or more of the preferred data rate and the preferred power usage, wherein the preferred number of Rx beams is greater than eight; and generate a message indicating the preferred number of Rx beams.

Example 8 is the computing apparatus of Example 7, wherein the preferred number of Rx beams is a number selected from a group comprising 12, 16, 20, 24, 28, 32, 36, 40, 44, 48, 52, 56, 60, and 64.

Example 9 is the computing apparatus of any of Examples 7-8, wherein the message is included in one of a medium access control (MAC) control element (MAC-CE), a Layer 1 measurement report, and a Layer 3 measurement report.

Example 10 is the computing apparatus of any of Examples 7-9, wherein the preferred number of Rx beams is a number present on a list of preferred numbers of Rx beams previously sent to the base station by the UE.

Example 11 is the computing apparatus of any of Examples 7-10, further comprising generating a second message indicating that the UE is configured perform the Rx beam sweep using one of a vertical polarization, a horizontal polarization, and both the vertical polarization and the horizontal polarization.

Example 12 is the computing apparatus of Example 11, wherein the second message is included in one of a radio resource control (RRC) message, a MAC-CE, and uplink control information (UCI).

Example 13 is a method of a UE, comprising: configuring the UE for group based beam reporting wherein the UE reports on a first receive (Rx) beam and a second Rx beam of a group of beams; determining that a transmit (Tx) beam from a base station can be received at the UE using both horizontally polarized antennas and vertically polarized antennas; and generating a group based beam reporting message, to send to the base station, comprising a same TC corresponding to the Tx beam for both the first Rx beam and the second Rx beam to indicate that the Tx beam can be received using both the horizontally polarized antennas and the vertically polarized antennas.

Example 14 is the method of Example 13, wherein the TCI corresponding to the Tx beam for each of the first Rx beam and the second Rx beam comprises a channel state information (CSI) reference signal (CSI-RS) resource indicator (CRI) or a synchronization signal block resource indicator (SSBRI).

Example 15 is the method of any of Examples 13-14, wherein the group based beam reporting message comprises a TCI codepoint comprising two TCI states, each TCI state corresponding to one of the first beam and the second beam and each indicating the same TCI corresponding to the Tx beam.

Example 16 is a method of a base station, comprising: configuring a UE for group based beam reporting wherein the UE reports on a first receive (Rx) beam and a second Rx beam of a group of beams; processing a group based beam reporting message from the UE, the group based beam reporting message comprising a same transmission configuration indication (TCI) corresponding to a transmit (Tx) beam for both the first Rx beam and the second Rx beam, indicating that the Tx beam can be received at the UE using both horizontally polarized antennas and vertically polarized antennas; and in response to the group based beam reporting message from the UE, scheduling two layer downlink (DL) multiple-input-multiple-output (MIMO) reception at the UE with the TCI.

Example 17 is the method of Example 16, wherein the TCI corresponding to the same Tx beam for each of the first Rx beam and the second Rx beam comprises a channel state information (CSI) reference signal (CSI-RS) resource indicator (CRI) or a synchronization signal block resource indicator (SSBRI).

Example 18 is the method of any of Examples 16-17, wherein the group based beam reporting message comprises a TCI codepoint comprising two TC states, each TCI state corresponding to one of the first beam and the second beam and each using the same TCI corresponding to the Tx beam.

Example 19 may include an apparatus comprising means to perform one or more elements of a method described in or related to any of the above Examples, or any other method or process described herein.

Example 20 may include one or more non-transitory computer-readable media comprising instructions to cause an electronic device, upon execution of the instructions by one or more processors of the electronic device, to perform one or more elements of a method described in or related to any of the above Examples, or any other method or process described herein.

Example 21 may include an apparatus comprising logic, modules, or circuitry to perform one or more elements of a method described in or related to any of the above Examples, or any other method or process described herein.

Example 22 may include a method, technique, or process as described in or related to any of the above Examples, or portions or parts thereof.

Example 23 may include an apparatus comprising: one or more processors and one or more computer-readable media comprising instructions that, when executed by the one or more processors, cause the one or more processors to perform the method, techniques, or process as described in or related to any of the above Examples, or portions thereof.

Example 24 may include a signal as described in or related to any of the above Examples, or portions or parts thereof.

Example 25 may include a datagram, packet, frame, segment, protocol data unit (PDU), or message as described in or related to any of the above Examples, or portions or parts thereof, or otherwise described in the present disclosure.

Example 26 may include a signal encoded with data as described in or related to any of the above Examples, or portions or parts thereof, or otherwise described in the present disclosure.

Example 27 may include a signal encoded with a datagram, packet, frame, segment, PDU, or message as described in or related to any of the above Examples, or portions or parts thereof, or otherwise described in the present disclosure.

Example 28 may include an electromagnetic signal carrying computer-readable instructions, wherein execution of the computer-readable instructions by one or more processors is to cause the one or more processors to perform the method, techniques, or process as described in or related to any of the above Examples, or portions thereof.

Example 29 may include a computer program comprising instructions, wherein execution of the program by a processing element is to cause the processing element to carry out the method, techniques, or process as described in or related to any of the above Examples, or portions thereof.

Example 30 may include a signal in a wireless network as shown and described herein.

Example 31 may include a method of communicating in a wireless network as shown and described herein.

Example 32 may include a system for providing wireless communication as shown and described herein.

Example 33 may include a device for providing wireless communication as shown and described herein.

Any of the above described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Embodiments and implementations of the systems and methods described herein may include various operations, which may be embodied in machine-executable instructions to be executed by a computer system. A computer system may include one or more general-purpose or special-purpose computers (or other electronic devices). The computer system may include hardware components that include specific logic for performing the operations or may include a combination of hardware, software, and/or firmware.

It should be recognized that the systems described herein include descriptions of specific embodiments. These embodiments can be combined into single systems, partially combined into other systems, split into multiple systems or divided or combined in other ways. In addition, it is contemplated that parameters, attributes, aspects, etc. of one embodiment can be used in another embodiment. The parameters, attributes, aspects, etc. are merely described in one or more embodiments for clarity, and it is recognized that the parameters, attributes, aspects, etc. can be combined with or substituted for parameters, attributes, aspects, etc. of another embodiment unless specifically disclaimed herein.

It is well understood that the use of personally identifiable information should follow privacy policies and practices that are generally recognized as meeting or exceeding industry or governmental requirements for maintaining the privacy of users. In particular, personally identifiable information data should be managed and handled so as to minimize risks of unintentional or unauthorized access or use, and the nature of authorized use should be clearly indicated to users.

Although the foregoing has been described in some detail for purposes of clarity, it will be apparent that certain changes and modifications may be made without departing from the principles thereof. It should be noted that there are many alternative ways of implementing both the processes and apparatuses described herein. Accordingly, the present embodiments are to be considered illustrative and not restrictive, and the description is not to be limited to the details given herein, but may be modified within the scope and equivalents of the appended claims.

The invention claimed is:

1. A method for wireless communications by a user equipment (UE), the method comprising:
   determining that one or more of a current UE data rate and a current UE power usage are different from, respectively, a preferred UE data rate and a preferred UE power usage;
   dynamically determining a preferred number of receive (Rx) beams to use for an Rx beam sweep at the UE based on one or more of the preferred data rate and the preferred power usage, wherein the preferred number of Rx beams is greater than eight;
   signaling, to a base station, the preferred number of Rx beams; and
   signaling, to the base station, that the UE is configured to perform the Rx beam sweep using one of a vertical polarization, a horizontal polarization, and both the vertical polarization and the horizontal polarization.

2. The method of claim 1, wherein the preferred number of Rx beams is a number selected from a group comprising 12, 16, 20, 24, 28, 32, 36, 40, 44, 48, 52, 56, 60, and 64.

3. The method of claim 1, wherein the preferred number of Rx beams is signaled to the base station as part of one of a medium access control (MAC) control element (MACCE), a Layer 1 measurement report, and a Layer 3 measurement report.

4. The method of claim 1, wherein the preferred number of Rx beams is a number present on a list of preferred numbers of Rx beams previously sent to the base station by the UE.

5. The method of claim 1, wherein the signaling that the UE is configured to perform the Rx beam sweep using one of the vertical polarization, the horizontal polarization, and both the vertical polarization and the horizontal polarization is included in one of a radio resource control (RRC) message, a MAC-CE, and uplink control information (UCI).

6. A computing apparatus of a user equipment (UE), comprising:
   memory; and
   processing circuitry connected with the memory and configured to:
      determine that one or more of a current UE data rate and a current UE power usage are different from, respectively, a preferred UE data rate and a preferred UE power usage;
      dynamically determine a preferred number of receive (Rx) beams to use for an Rx beam sweep at the UE based on one or more of the preferred data rate and the preferred power usage, wherein the preferred number of Rx beams is greater than eight;
      generate a message indicating the preferred number of Rx beams; and
      generate a second message indicating that the UE is configured to perform the Rx beam sweep using one of a vertical polarization, a horizontal polarization, and both the vertical polarization and the horizontal polarization.

7. The computing apparatus of claim 6, wherein the preferred number of Rx beams is a number selected from a group comprising 12, 16, 20, 24, 28, 32, 36, 40, 44, 48, 52, 56, 60, and 64.

8. The computing apparatus of claim 6, wherein the message is included in one of a medium access control (MAC) control element (MAC-CE), a Layer 1 measurement report, and a Layer 3 measurement report.

9. The computing apparatus of claim 6, wherein the preferred number of Rx beams is a number present on a list of preferred numbers of Rx beams previously sent to the base station by the UE.

10. The computing apparatus of claim 6, wherein the second message is included in one of a radio resource control (RRC) message, a MAC-CE, and uplink control information (UCI).

11. A method of a base station, comprising:
   configuring a UE for group based beam reporting wherein the UE reports on a first receive (Rx) beam and a second Rx beam of a group of beams;
   processing a group based beam reporting message from the UE, the group based beam reporting message comprising a same transmission configuration indication (TCI) corresponding to a transmit (Tx) beam for both the first Rx beam and the second Rx beam, indicating that the Tx beam can be received at the UE using both horizontally polarized antennas and vertically polarized antennas; and
   in response to the group based beam reporting message from the UE, scheduling two layer downlink (DL) multiple-input-multiple-output (MIMO) reception at the UE with the TCI.

12. The method of claim 11, wherein the TCI corresponding to the same Tx beam for each of the first Rx beam and the second Rx beam comprises a channel state information (CSI) reference signal (CSI-RS) resource indicator (CRI) or a synchronization signal block resource indicator (SSBRI).

13. The method of claim 11, wherein the group based beam reporting message comprises a TCI codepoint comprising two TCI states, each TCI state corresponding to one of the first beam and the second beam and each using the same TCI corresponding to the Tx beam.

14. An apparatus for a user equipment (UE), comprising:
   means for performing operations included in the method of claim 1.

15. An apparatus for a base station, comprising:
   means for performing operations included in the method of claim 11.

* * * * *